United States Patent
Jiang et al.

(10) Patent No.: US 10,843,689 B2
(45) Date of Patent: Nov. 24, 2020

(54) COLLISION AVOIDANCE FOR A CONNECTED VEHICLE BASED ON A DIGITAL BEHAVIORAL TWIN

(71) Applicant: TOYOTA JIDOSHA KABUSHIKI KAISHA, Toyota (JP)

(72) Inventors: Zhihao Jiang, Mountain View, CA (US); Shinichi Shiraishi, Tokyo (JP); BaekGyu Kim, Mountain View, CA (US)

(*) Notice: Subject to any disclaimer, the term of this patent is extended or adjusted under 35 U.S.C. 154(b) by 232 days.

(21) Appl. No.: 16/007,796

(22) Filed: Jun. 13, 2018

(65) Prior Publication Data
US 2019/0382003 A1    Dec. 19, 2019

(51) Int. Cl.
| | |
|---|---|
| B60W 30/09 | (2012.01) |
| B60W 50/14 | (2020.01) |
| G05D 1/02 | (2020.01) |
| G08G 1/16 | (2006.01) |
| G05D 1/00 | (2006.01) |
| G02B 27/01 | (2006.01) |
| G06T 19/00 | (2011.01) |

(52) U.S. Cl.
CPC ............ *B60W 30/09* (2013.01); *B60W 50/14* (2013.01); *G05D 1/0088* (2013.01); *G05D 1/0214* (2013.01); *G08G 1/163* (2013.01); *G08G 1/166* (2013.01); *B60W 2050/146* (2013.01); *B60W 2556/55* (2020.02); *G02B 27/01* (2013.01); *G05D 2201/0213* (2013.01); *G06T 19/006* (2013.01)

(58) Field of Classification Search
CPC .... B60W 30/09; B60W 50/14; G05D 1/0088; G05G 1/163; G08G 1/166
USPC .......................................................... 701/23
See application file for complete search history.

(56) References Cited

U.S. PATENT DOCUMENTS

| | | | |
|---|---|---|---|
| 7,124,027 B1 | 10/2006 | Ernst, Jr. et al. | |
| 2017/0113683 A1* | 4/2017 | Mudalige | B60W 30/0953 |
| 2018/0077518 A1* | 3/2018 | Nguyen | G08G 1/096791 |
| 2018/0259956 A1* | 9/2018 | Kawamoto | B60W 50/082 |
| 2018/0328752 A1* | 11/2018 | Tomatsu | G01C 21/3658 |

* cited by examiner

*Primary Examiner* — Yazan A Soofi
(74) *Attorney, Agent, or Firm* — Burbage Law, P.C.; Jon-Michael Burbage; Elizabeth Ruzich

(57) ABSTRACT

The disclosure includes embodiments for a digital behavioral twin for collision avoidance. In some embodiments, a method includes recording digital data describing a driving context and a driving behavior of a remote vehicle and an ego vehicle in this driving context. In some embodiments, one or more of the remote vehicle and the ego vehicle is a connected vehicle. The method includes determining a risk of a collision involving one or more of the remote vehicle and the ego vehicle based on a first digital behavioral twin of the remote vehicle, a second digital behavioral twin of the ego vehicle and the digital data. The method includes modifying an operation of the ego vehicle based on the risk.

20 Claims, 11 Drawing Sheets

| | Models the behavior of ego drivers? | Builds a digital behavioral twin of an ego vehicle? | Updates a digital behavioral twin of a remote vehicle? | Uses V2V technology to collaboratively share digital behavioral twins among many different vehicles? | Uses AR technology to provide a visual warning of a collision? | Supports probabilistic analysis for risk analysis? | Considers historical driver behavior? |
|---|---|---|---|---|---|---|---|
| Embodiments Described Herein | Yes | Yes | Yes | Yes | Yes | Yes | Yes |
| First Existing Solution | No | No | No | No | No | No | No |
| Second Existing Solution | No | No | No | No | No | No | No |
| Third Existing Solution | No | No | No | No | No | No | No |

Figure 10

COLLISION AVOIDANCE FOR A CONNECTED VEHICLE BASED ON A DIGITAL BEHAVIORAL TWIN

BACKGROUND

The specification relates to a digital behavioral twin for collision avoidance.

There are many different collision avoidance systems available or being developed today. Most of these existing solutions work by using onboard vehicle sensors to measure the environment of an ego vehicle and then determining a current driving behavior of other remote vehicles that are nearby. The problem with this approach is that they do not predict future driving behavior of the remote vehicles or the ego vehicle. As a result, the existing solutions are only capable of evaluating a current driving scenario and are incapable of evaluating a future driving scenario.

A first existing solution includes an Adaptive Cruise Control (ACC) system that is installed in an ego vehicle. The ACC system uses the onboard sensors of the ego vehicle to observe the current behavior of nearby vehicles and generate models that describe the current behavior of nearby vehicles based on this observed behavior. However, a first example problem with this existing solution is unable to estimate driver behavior of the remote vehicles before it happens. A second example problem with this existing solution is that this existing solution does not incorporate sensor data recorded by other nearby vehicles into its models of the nearby vehicles (e.g., the sensor data recorded by the other nearby vehicles and describing these nearby vehicles themselves). A third example problem with this existing solution is that this existing solution does not use vehicle-to-anything (V2X) or vehicle-to-vehicle (V2V) communication technology to collaborate with other nearby vehicles. A fourth example problem with this existing solution is that this existing solution does not use augmented reality (AR) technology to provide warnings to a driver of the ego vehicle about the threat of collisions with the other nearby vehicles.

A second existing solution includes a driver assistance system that is installed in an ego vehicle. The driver assistance system uses the onboard sensors of the ego vehicle to observe the driving environment and the current behavior of other nearby vehicles. The driver assistance system models the environment, including the nearby vehicles, based on the onboard sensor measurements. However, this second existing solution includes problems that are similar to those described above for the first existing solution. These example problems were described above for the first existing solution and will not be repeated here.

A third existing solution includes a driver assistance system that is installed in an ego vehicle. The driver assistance system uses onboard sensors of the ego vehicle to determine an "attitude level" of an ego driver of an ego vehicle. The driver assistance system then determines the driving intention of other remote drivers of remote vehicles. Warnings are generated by the driver assistance system based on the driving intention of the remote vehicles. The primary functionality of the driver assistance system is to determine the attitude level of the ego driver and then fine tune when the warnings are delivered to the ego driver based on their attitude level. In other words, the timing for delivery of the warnings is determined based on the attitude level.

SUMMARY

Described herein are embodiments of a digital behavioral twin system. FIG. 10 depicts example differences between the embodiments of the digital behavioral twin described herein and the first, second, and third existing solutions described above.

In some embodiments, the digital behavioral twin system includes software stored in a cloud server. The digital behavioral twin system aggregates sensor information for vehicles in the real-world that describes the behavior of the vehicle that recorded the sensor information, and the behavior of other vehicles while traveling on roadways, as well as the context for this behavior (i.e., the events occurring during this behavior, before this behavior and possibly after this behavior). Each instance of sensor information is associated with a unique identifier so that the digital behavioral twin system knows a unique identity (e.g., VIN or license plate information) of the vehicle which is described by the sensor information. The digital behavioral twin system generates digital behavioral twins for these vehicles and stores them in the cloud server. The digital behavioral twin of a vehicle is analyzable to predict the future behavior of vehicles based on their current or future context. The cloud server is operable to provide digital data, referred to as "twin data," describing the digital behavioral twins to vehicles that use a digital twin service that is provided by the digital behavioral twin system. Vehicles that use the digital twin service include a small software client stored in their electronic control unit, or some other onboard vehicle computer, referred to as a "twin client." The twin client retrieves twin data for each of the vehicles in its geographic vicinity. The twin client uses this twin data, as well as its local sensor information describing the current driving context for each vehicle in its vicinity, to estimate: (1) the behavior of the drivers in different contexts; and (2) whether collisions are likely in different portions of the roadway. The twin client incorporates AR technology which uses a heads-up display unit (HUD) to display colored transparent overlays that visually depict risk of collision for each portion of the roadway currently being traveled (or about to be traveled), along with optional audio warnings. In some embodiments, the digital behavioral twin system operates with other vehicles that are unconnected vehicles since the cloud server includes twin data for vehicles whether or not they are connected vehicles.

In some embodiments, the twin client of an ego vehicle is operable to solve the problem by estimating the future behavior of remote drivers without the onboard sensors of the ego vehicle ever directly observing the remote drivers operate their remote vehicles. For example, the twin client estimates the future behavior of the remote drivers based on a digital behavioral twin of the remote drivers and sensor data describing a behavior of the remote drivers that is received via V2X or V2V communications with other wireless endpoints (e.g., the remote vehicle or a roadside unit acting as a relay point). Because of this, the twin client operates quickly and gives ego drivers more time to respond to dangerous situations, which increases driver safety for the ego driver and other drivers on the roadway. In some embodiments, the twin client considers all future possible behaviors of drivers but focuses on the ones with a high probability of occurring.

The existing solutions do not solve the problem of predicting a driver's future behavior. By comparison, the twin client described herein predict other driver's future behavior without directly observing any behavior of the remote drivers. The digital behavioral twin system described herein build digital behavioral twins in a cloud server and then distributes digital data describing these digital behavioral twins to vehicles that are compatible with the digital behavioral twin system because they include a twin client. The existing solutions do not consider using digital twin technology as is done by the embodiments described herein. In some embodiments, the twin client also utilizes AR technology in novel and meaningful ways that are not considered by the existing solutions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: recording digital data describing a driving context and a driving behavior of a remote vehicle and an ego vehicle in this driving context; determining a risk of a collision involving one or more of the remote vehicle and the ego vehicle based on a first digital behavioral twin of the remote vehicle, a second digital behavioral twin of the ego vehicle and the digital data; and modifying an operation of the ego vehicle based on the risk. Other embodiments of this aspect include corresponding computer systems, apparatus, and computer programs recorded on one or more computer storage devices, each configured to perform the actions of the methods.

Implementations may include one or more of the following features. The method where modifying the operation of the ego vehicle includes an electronic display of the ego vehicle displaying a graphical output that visually depicts the risk. The method where the graphical output is an AR visualization. The method further including the remote vehicle transmitting a V2X message to the ego vehicle, where the V2X messages includes remote twin data describing the first digital behavioral twin. The method where the first digital behavioral twin models the driving behavior of a remote driver of the remote vehicle in a plurality of different driving contexts. The method where the second digital behavioral twin models the driving behavior of an ego driver of the ego vehicle in a plurality of different driving contexts. The method where the ego vehicle is an autonomous vehicle. The method where modifying the operation of the ego vehicle includes the ego vehicle autonomously taking an action to modify the risk. The method further including modifying the first digital behavioral twin based on new digital data describing a different driving behavior of the remote vehicle in the driving context, where the first digital behavioral twin is modified to include this different driving behavior. Implementations of the described techniques may include hardware, a method or process, or computer software on a computer-accessible medium.

One general aspect includes a system including: a non-transitory memory storing digital data describing a driving context and a driving behavior of a remote vehicle and an ego vehicle in this driving context; and a processor that is communicatively coupled to the non-transitory memory, where the non-transitory memory stores computer code which, when executed by the processor, causes the processor to: determine a risk of a collision involving one or more of the remote vehicle and the ego vehicle based on a first digital behavioral twin of the remote vehicle, a second digital behavioral twin of the ego vehicle and the digital data; and modify an operation of the ego vehicle based on the risk. Other embodiments of this aspect include corresponding computer systems, apparatus, and computer programs recorded on one or more computer storage devices, each configured to perform the actions of the methods.

Implementations may include one or more of the following features. The system where modifying the operation of the ego vehicle includes an electronic display of the ego vehicle displaying a graphical output that visually depicts the risk. The system where the graphical output is an AR visualization. The system where the first digital behavioral twin is described by remote twin data that is received via a V2X message received by the ego vehicle and transmitted by the remote vehicle. The system where the first digital behavioral twin models the driving behavior of a remote driver of the remote vehicle in a plurality of different driving contexts. The system where the second digital behavioral twin models the driving behavior of an ego driver of the ego vehicle in a plurality of different driving contexts. The system where the ego vehicle is an autonomous vehicle and modifying the operation of the ego vehicle includes the ego vehicle autonomously taking an action to modify the risk. The system where the non-transitory memory stores additional computer code which, when executed by the processor, causes the processor to modify the first digital behavioral twin based on new digital data describing a different driving behavior of the remote vehicle in the driving context, where the first digital behavioral twin is modified to include this different driving behavior. Implementations of the described techniques may include hardware, a method or process, or computer software on a computer-accessible medium.

One general aspect includes a computer program product including a non-transitory memory storing computer-executable code that, when executed by a processor, causes the processor to: record digital data describing a driving context and a driving behavior of a remote vehicle and an ego vehicle in this driving context; determine a risk of a collision involving one or more of the remote vehicle and the ego vehicle based on a first digital behavioral twin of the remote vehicle, a second digital behavioral twin of the ego vehicle and the digital data; and modify an operation of the ego vehicle based on the risk. Other embodiments of this aspect include corresponding computer systems, apparatus, and computer programs recorded on one or more computer storage devices, each configured to perform the actions of the methods.

Implementations may include one or more of the following features. The computer program product where modifying the operation of the ego vehicle includes an electronic display of the ego vehicle displaying a graphical output that visually depicts the risk. The computer program product where the computer-executable code, when executed by the processor, further causes the processor to modify the first digital behavioral twin based on new digital data describing a different driving behavior of the remote vehicle in the driving context, where the first digital behavioral twin is modified to include this different driving behavior. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 10 includes a table depicting a comparison of the embodiments described herein versus the existing solutions described in the background according to some embodiments.

DETAILED DESCRIPTION

Figure 1:
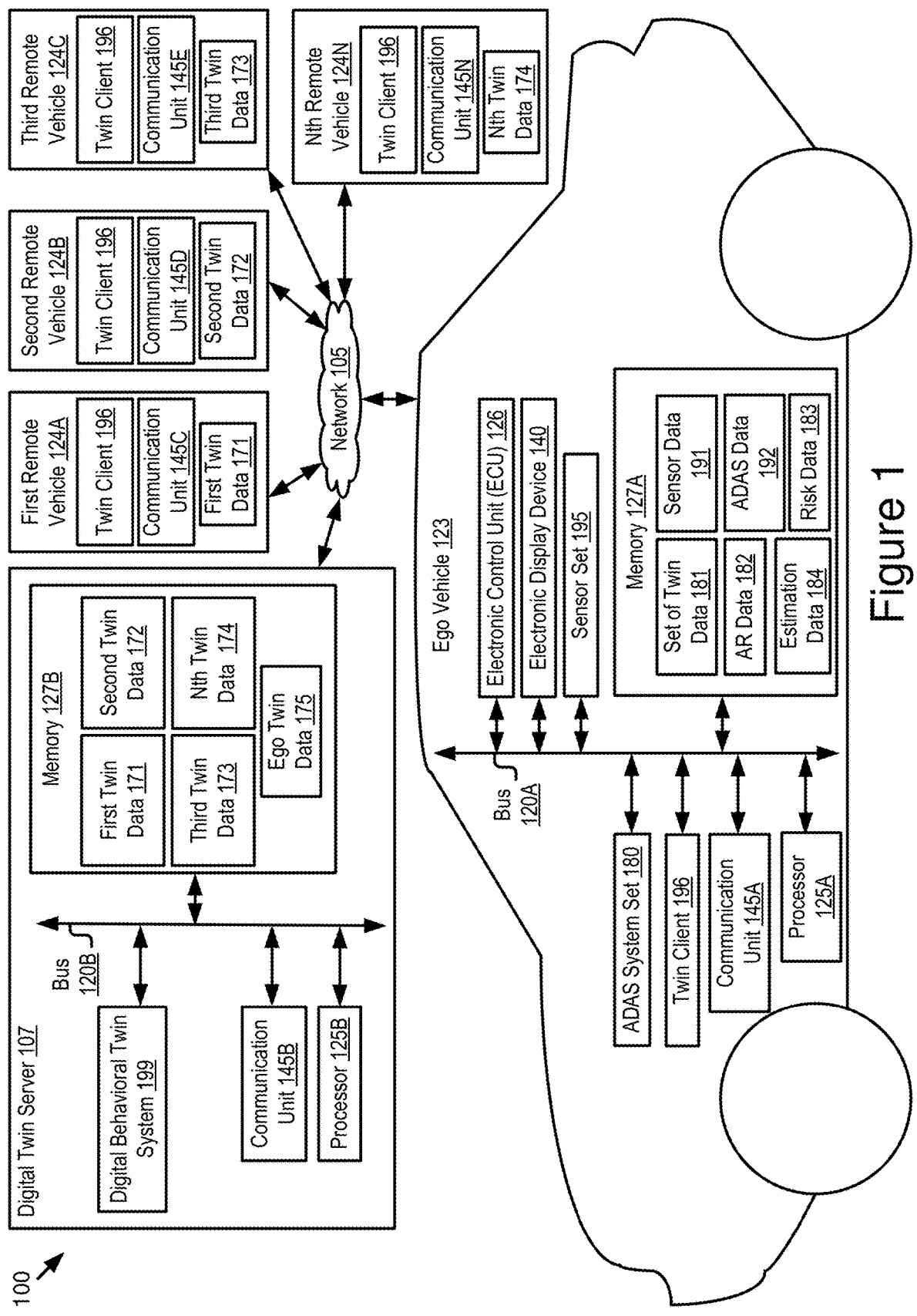
FIG. 1 is a block diagram illustrating an operating environment for a digital behavioral twin system and a twin client according to some embodiments.

There are many different collision avoidance systems available or being developed today. Most of these existing solutions work by using onboard vehicle sensors to measure the environment of an ego vehicle and then determining a current driving behavior of other remote vehicles that are nearby. The problem with this approach is that they do not predict future driving behavior of the remote vehicles or the ego vehicle. As a result, the existing solutions are only capable of evaluating a current driving scenario and are incapable of evaluating a future driving scenario.

Described herein are embodiments of a digital behavioral twin system and a twin client. The digital behavioral twin system includes software that generates a digital behavioral twin. The digital behavioral twin system is installed in a cloud server. The twin client is installed in an onboard vehicle computer of an ego vehicle. The twin client wirelessly communicates with the digital behavioral twin system installed in the cloud server to receive twin data that describes the digital behavioral twin. The twin client receives the twin data. The twin client analyzes the twin data and estimates, based on the digital behavioral twin described by the twin data, the behavior of other remote drivers based on their historical behavior. In this way the twin client of an ego vehicle is operable to estimate the behavior of remote drivers of remote vehicles without the onboard sensors of the ego vehicle ever having observed the behavior of these drivers. The twin client is able to estimate the future behavior of the remote drivers because the onboard sensors of the ego vehicle do not need to observe the remote driver's behaviors before estimating their future driving behavior. In some embodiments, the twin client considers all future possible behaviors of the remote drivers but focuses on the ones with a high probability of occurring.

As briefly described above, the embodiments described herein include two components: (1) a digital behavioral twin system stored on a cloud server; and (2) a twin client stored in an ECU, or some other onboard vehicle computer, of an ego vehicle. These elements of the embodiments are now described in more detail.

In some embodiments, the digital behavioral twin system is software stored on a cloud server that aggregates sensor information for vehicles in the real-world. The sensor information describes their behavior, and the behavior of other vehicles, the context for these behaviors and uniquely identifying information for each vehicle.

Assume a roadway environment includes: (1) an ego vehicle; and (2) a set of remote vehicles. The ego vehicle is a connected vehicle that includes a twin client. The remote vehicles may or may not be connected vehicles. The remote vehicles may or may not include a twin client. The driver of the ego vehicle is referred to as the "ego driver," whereas a driver of a remote vehicle is referred to as a "remote driver."

In some embodiments, the digital behavioral twin system includes a modeling application and a game engine. In some embodiments, the modeling application includes any Modelica-based modeling application. The modeling application may include CarSim (distributed by Mechanical Simulation Corporation or Ann Arbor, Mich.), MapleSim (distributed by Maplesoft of Waterloo, Ontario) or any other Modelica-based modeling application.

In some embodiments, the game engine is a Unity-based game engine (such as the Unity game engine distributed by Unity Technology of San Francisco, Calif.), or any other game engine which is operable, when executed by a processor, to generate a digital simulation (herein "simulation") for testing and monitoring the operation of a virtual vehicle that represents a real-world vehicle that exists in the real-world.

The modeling application includes code and routines that are operable, when executed by a processor, to generate vehicle model data that describes a vehicle model of a vehicle. The vehicle model data includes any digital data that is necessary to cause the game engine to generate a virtualized version of the real-world vehicle.

Example embodiments of generating vehicle model data are described in U.S. patent application Ser. No. 15/925,070 filed on Mar. 19, 2018 and entitled "Sensor-Based Digital Twin System for Vehicular Analysis," the entirety of which is hereby incorporated by reference. Additional example embodiments of generating a digital behavioral twin are described in U.S. patent application Ser. No. 16/007,693 filed on Jun. 13, 2008 and entitled "Digital Twin for Vehicle Risk Evaluation," the entirety of which is herein incorporated by reference.

In some embodiments, the twin client includes software stored in the ECU (or some other onboard vehicle computer) of the ego vehicle (and optionally one or more of the remote vehicles). The ego vehicle includes a set of sensors and an ADAS system set 180. The sensors and ADAS systems record digital data that describe: (1) a behavior of the ego driver of the ego vehicle, as well as the context for this behavior [i.e., events occurring before, during or perhaps after the driving behavior including the behavior of other drivers, time of day, day of week, weather, whether the conditions are urban or rural, etc.]; (2) a behavior of the remote driver(s) of the remote vehicle(s), as well as the context for this behavior; and (3) uniquely identifying information of the ego vehicle [e.g., a VIN number] and the remote vehicles [e.g., license plate information such as the license plate number and state, province, commonwealth or other jurisdiction that issued the license plate]. This digital data is referred to herein as ADAS data and sensor data. The twin client of the ego vehicle transmits wireless messages including the ADAS data and the sensor data to the digital behavioral twin system of the cloud server via a wireless network. In this way the digital behavioral twin system receives digital data describing the driving behaviors of both connected vehicles (e.g., the ego vehicle) and unconnected vehicles (e.g., the remote vehicles) as well as the context for these behaviors.

A roadway may include various ego vehicles, so that the digital behavioral twin system receives multiple instances of ADAS data and sensor data. However, for the purpose of clarity and simplicity, the embodiments of the digital behavioral twin system and the twin client are now described below with reference to a single ego vehicle.

In some embodiments, the digital behavioral twin system generates digital behavioral twins for the ego vehicle and the remote vehicles. A digital behavioral twin of a vehicle is analyzable to predict the future behavior of vehicles based on their current driving context. "Twin data" is digital data that describes one or more digital behavioral twins. The cloud server is operable to provide twin data to vehicles having a twin client (the ego vehicle, and optionally one or more remote vehicles, include a twin client).

In some embodiments, the twin client receives twin data for each of the vehicles in its geographic vicinity. The twin client includes code and routines that are operable, when executed by the ECU, to use this twin data, as well as its local sensor information describing the current driving context for each vehicle in its vicinity, to estimate: (1) the behavior of the drivers in different contexts and (2) whether collisions are likely in different portions of the roadway.

Figure 4:
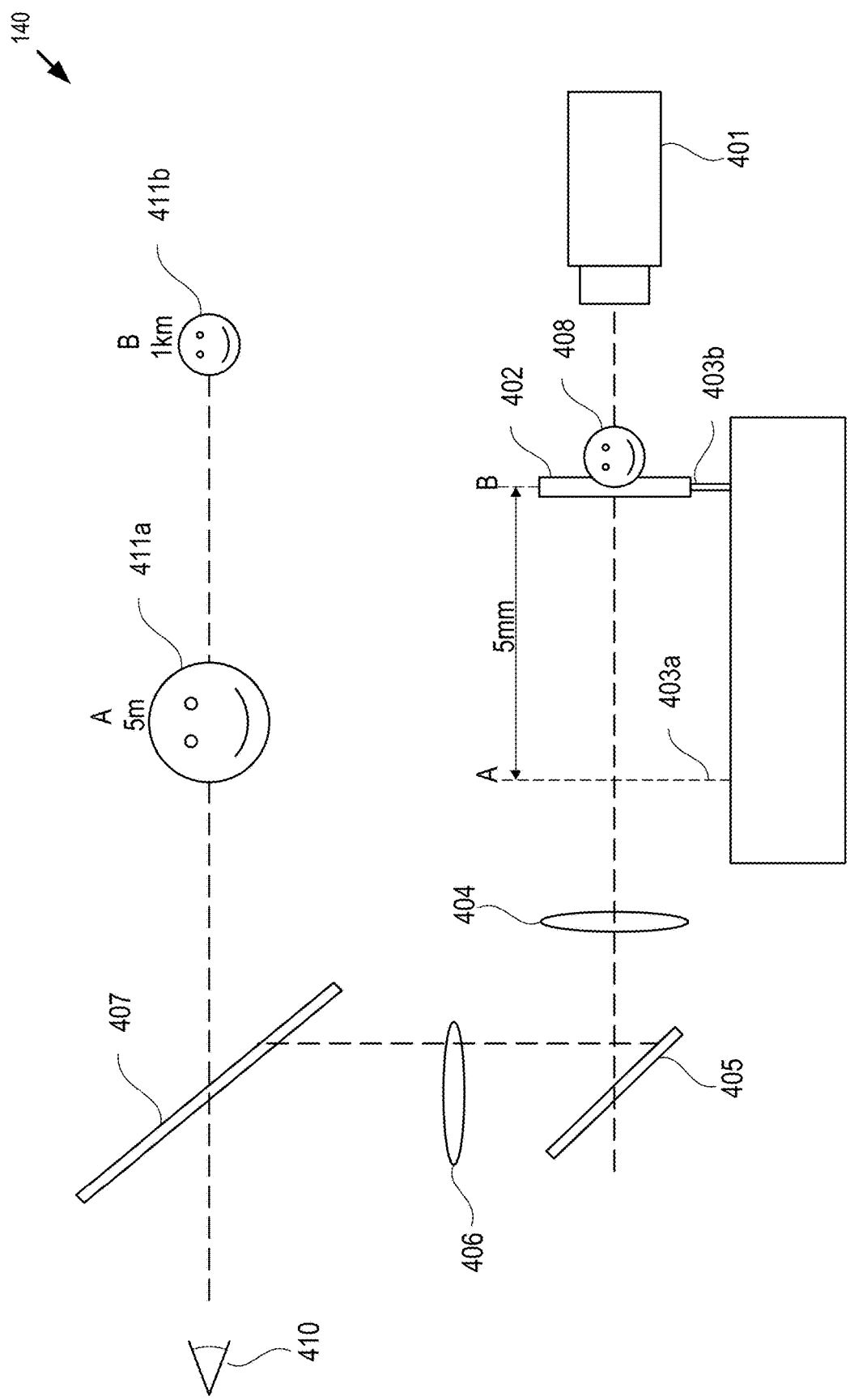
FIG. 4 is a block diagram illustrating an overview of an electronic display according to some embodiments.

In some embodiments, the twin client incorporates AR technology which uses a heads-up display unit (HUD) to display colored transparent overlays that visually depict risk of collision for each portion of the roadway currently being traveled (or about to be traveled), along with optional audio warnings. In some embodiments, the HUD is a three-dimensional heads-up display unit (3D-HUD). An example of a 3D-HUD is depicted in FIG. 4 according to some embodiments.

In some embodiments, the twin client of the ego vehicle estimates dangerous behaviors of nearby remote vehicles based on their digital behavioral twins. The twin client controls the operation of the HUD and causes the HUD to color regions on the road visible by the ego driver with colors that indicate the risk of collision estimated for each region of the roadway. In this way, the digital behavioral twin system warns the ego driver before dangerous actions of other remote drivers are taken, which provides the ego driver more time to avoid collision compared to existing collision warning systems.

In some embodiments, the digital behavioral twin for the ego vehicle includes digital data that describes, for example, one or more of the following: (1) different driving scenarios and how the ego driver would respond in these driving scenarios; and (2) different complex patterns of behavior for the ego driver that are inherently difficult to predict.

Examples of complex patterns of behavior that are described by the digital behavioral twin include one or more of the following: (1) for scenarios where a traffic light has turned yellow, the digital behavioral twin describes how likely is it that the ego driver will begin accelerating and speed through the yellow traffic light; (2) for scenarios where the traffic light has turned yellow, the digital behavioral twin describes how likely is it that the ego driver will begin accelerating and speed through the traffic light even after it has turned red; (3) for scenarios where the traffic light has turned yellow, the digital behavioral twin describes how likely is it that the ego driver will begin accelerating and then regret their decision and try to hard brake at the last moment to stop for the traffic light; (4) the digital behavioral twin describes how quickly will the ego driver begin to accelerate after a traffic light turns green; (5) for scenarios where the ego driver hard brakes (in any situation, not just one involving traffic lights), the digital behavioral twin describes how likely is it that there is a traffic accident ahead of the ego driver; and (6) any other pattern of driver behavior.

Figure 5A:
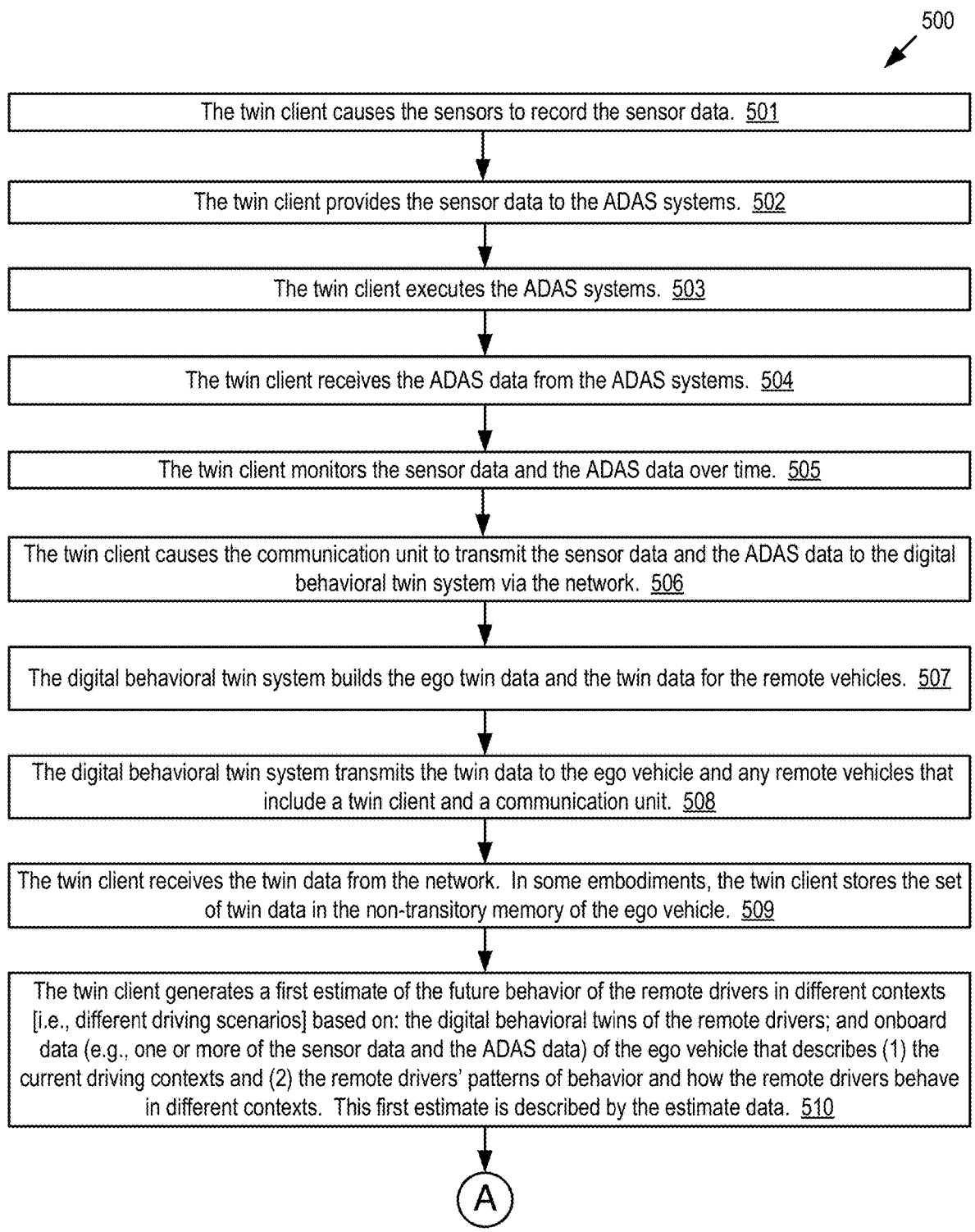
FIGS. 5A and 5B include a flowchart of an example method for providing a digital twin service according to some embodiments.
Figure 5B:
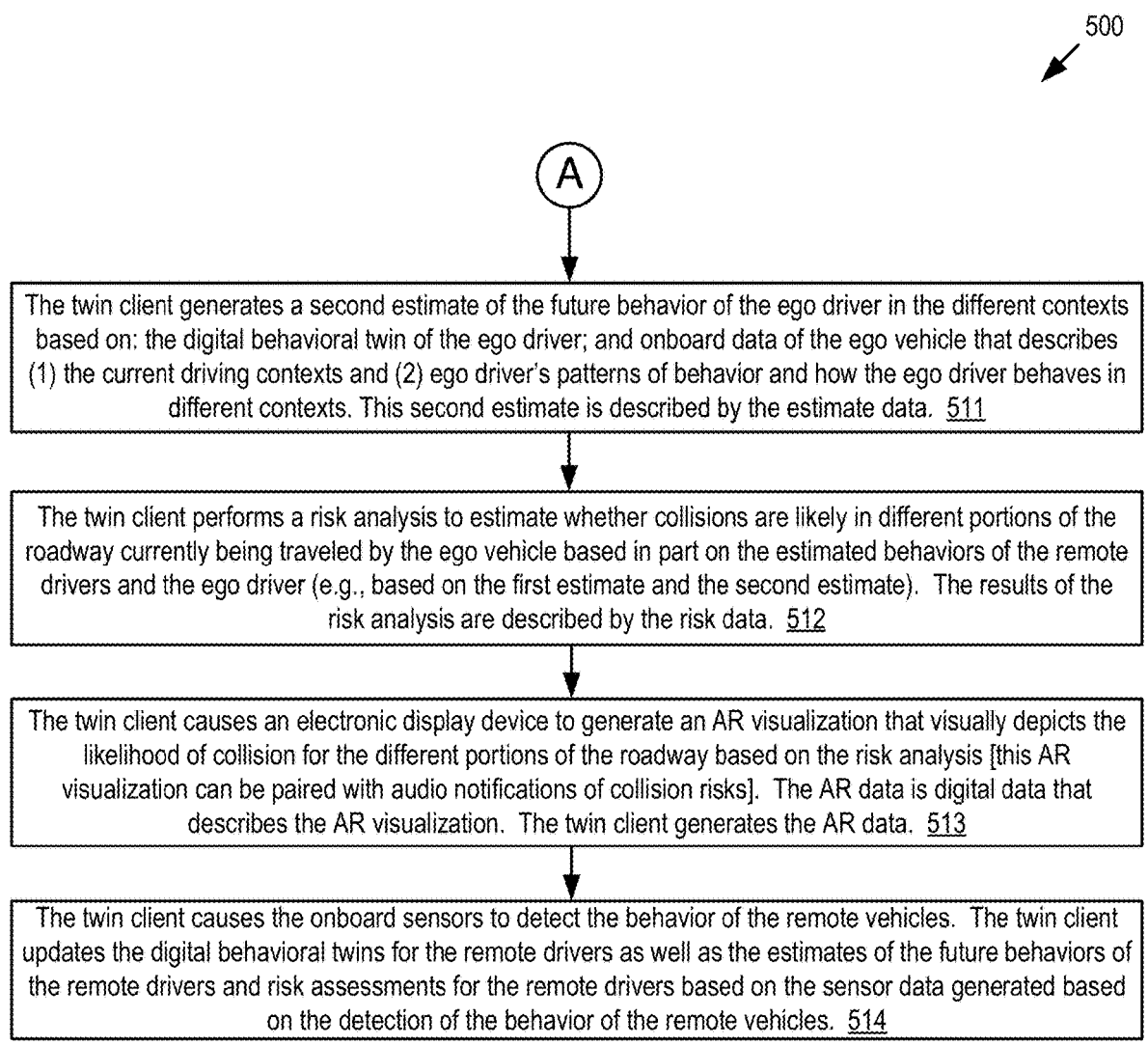

In some embodiments, the digital behavioral twin system includes code and routines that are operable, when executed by a processor of the server, to cause the processor to execute one or more of the steps of the method 500 depicted in FIGS. 5A and 5B.

Figure 3:
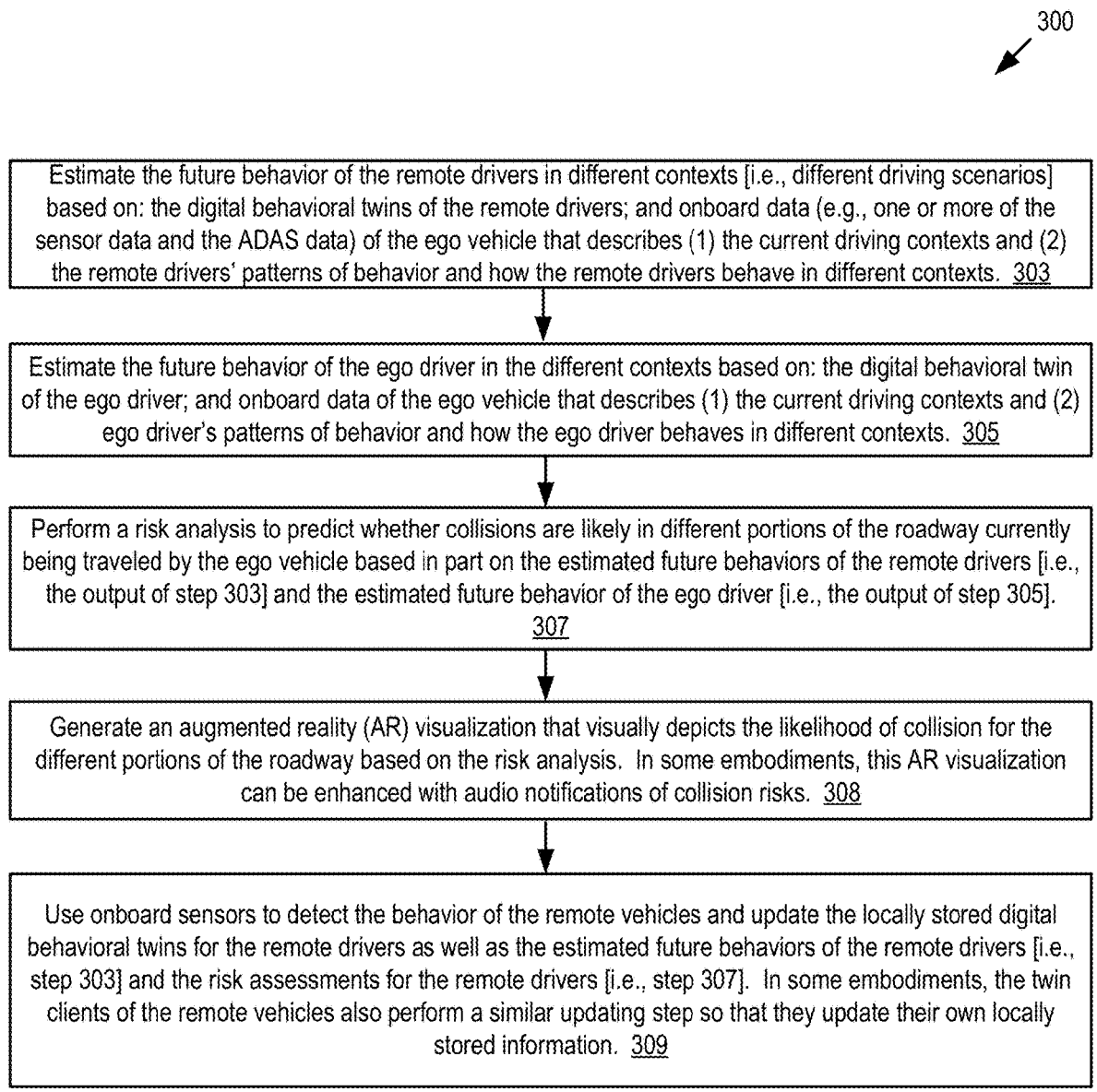
FIG. 3 includes a flowchart of an example method for providing a digital twin service for a real-world vehicle according to some embodiments.

In some embodiments, the twin client includes code and routines that are operable, when executed by a processor of a vehicle, to cause the processor to execute one or more of the steps of the method 300 depicted in FIG. 3. For example, the twin client includes code and routines that are operable, when executed by the ECU of an ego vehicle, to cause the ECU to execute one or more of the following steps: (1) estimate the future behavior of the remote drivers in different contexts [i.e., different driving scenarios] based on: the digital behavioral twins of the remote drivers; and onboard data (e.g., one or more of the sensor data and the ADAS data) of the ego vehicle that describes (a) the current driving contexts and (b) the remote drivers' patterns of behavior and how the remote drivers behave in different contexts; (2) estimate the future behavior of the ego driver in the different contexts based on: the digital behavioral twin of the ego driver; and onboard data of the ego vehicle that describes (a) the current driving contexts and (b) ego driver's patterns of behavior and how the ego driver behaves in different contexts; (3) perform a risk analysis to predict whether collisions are likely in different portions of the roadway currently being traveled by the ego vehicle based in part on the estimated future behaviors of the remote drivers and the estimated future behavior of the ego driver; (4) generate an AR visualization that visually depicts the likelihood of collision for the different portions of the roadway based on the risk analysis; and (5) use the sensor data generated by the ego vehicle's onboard sensors to detect the behavior of the remote vehicles and update the locally stored digital behavioral twins for the remote drivers as well as the estimated future behaviors of the remote drivers and the risk assessments for the remote drivers. In some embodiments, one or more of steps (1) through (4) are executed before the ego vehicle's onboard sensors ever monitor the remote vehicles (e.g., observe the remote vehicle's behavior). Because of this, the twin client is operable to provide risk notifications more quickly than the existing solutions.

In some embodiments, the twin client includes code and routines that are operable, when executed by a processor of a vehicle, to cause the processor to execute one or more of the steps of the method 500 depicted in FIGS. 5A and 5B. In some embodiments, the twin client includes code and routines that are operable, when executed by a processor of a vehicle, to cause the processor to execute one or more of the steps of the method 600 depicted in FIG. 6. In some embodiments, the twin client includes code and routines that are operable, when executed by a processor of a vehicle, to cause the processor to execute one or more of the steps of the method 700 depicted in FIG. 7.

As described above, other relevant vehicles traveling on the roadway at the same time as the ego vehicle are referred to as "remote vehicles" and they are driven by "remote drivers." In some embodiments, at least some of these remote vehicles also include an instance of the twin client. In some embodiments the twin client of the ego vehicle uses V2X or V2V communication to share the digital behavioral twin of the ego vehicle with the twin client of these remote vehicles. Suitable forms of V2X or V2V communication include, for example, Dedicated Short Range Communication (DSRC), mmWave, omni-directional V2V communication (e.g., IEEE 802.11p), 3G, 4G, 5G, LTE or any other form of V2V communication described below with reference to the network 105 or the communication unit 145.

In some embodiments, the vehicles themselves include a digital behavioral twin system so that they are able to generate their own digital behavioral twins of vehicles.

In some embodiments, the twin data that describes the digital behavioral twins, as well as the ADAS data and the sensor data, are shared in an anonymous fashion so that the driver's identity is protected. The digital behavioral twin also does not include private information such as the driver's locations at different times. In some embodiments, all forms of wireless communication utilized by the digital behavioral twin system and the twin client are secure. For example, they are encrypted or utilize a virtual private network (VPN) tunnel.

Example advantages of the embodiments are now described. First, potential collision can be predicted before the remote vehicles take actions, which gives the ego driver more time to perform a collision avoidance maneuver. Second, all data included in the digital behavioral twin is anonymous and devoid of information that is privacy sensitive. Third, the AR visualization provided by the twin client is beneficial because it reduces reduce mental fatigue of the ego driver by visualizing risks using more intuitive safe/unsafe regions, which can be mentally processed by the ego driver using their sub-conscious. The AR visualization is also beneficial because it is non-intrusive, i.e., it is only triggered if a collision is imminent. The sound warning provided cotemporaneous with the AR visualization is also non-intrusive as it is only triggered if a collision is imminent.

ADAS System

In some embodiments, an ego vehicle includes a twin client which is executed by an ECU of the ego vehicle. The ego vehicle includes onboard systems and onboard sensors that monitor the condition of the vehicle and its components, and track for the occurrence of significant traffic events such as traffic accidents. For example, the onboard systems of the vehicle include one or more ADAS systems which monitor for and seek to avoid traffic accidents, and generate digital data describing when such events/accidents occur. Examples of ADAS systems are described below.

Examples of an ADAS system may include one or more of the following elements of an real-world vehicle: an adaptive cruise control (ACC) system; a lane keeping assistant system (LKA); an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in a real-world vehicle that makes that vehicle be an autonomous vehicle or a semi-autonomous vehicle.

In some embodiments, the ADAS system may be a vehicular system that is operable to perform or control the performance of one or more of the following vehicle functions: the steering of the vehicle; the braking of the vehicle; the acceleration of the vehicle; the operation of a transmission of the vehicle; and how aggressive or passive (e.g., fast or slow, respectively) the transmission changes one or more gears of the transmission. In this way, the ADAS system modifies the operation of an autonomous or semi-autonomous vehicle.

In some embodiments, the ADAS system may be a vehicular system that is operable to perform or control the performance of one or more of the following vehicle functions: how easily a steering wheel of the vehicle is turned by a driver of the vehicle; how much resistance the steering wheel provides to the driver when the driver attempts to turn the steering wheel; how readily a braking system of the vehicle decelerates or stops the vehicle when the driver depresses a braking pedal of the vehicle; how readily engine of the vehicle accelerates when the driver of the vehicle depresses an accelerator of the vehicle; how aggressive or passive (e.g., fast or slow, respectively) the transmission changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine. In this way, an ADAS system of the vehicle is operable to affect the performance or operation of one or more vehicle components (or their apparent performance as viewed from the perspective of the driver of the vehicle), including, for example: a power steering pump of the vehicle; a braking system of the vehicle; a fuel line of the vehicle; a fuel injector of the vehicle; a transmission of the vehicle; and an engine of the vehicle.

System Overview

Referring to FIG. 1, depicted is an operating environment 100 for a digital behavioral twin system 199 and a twin client 196 according to some embodiments. The operating environment 100 as depicted includes an ego vehicle 123; a first remote vehicle 124A, a second remote vehicle 124B, a third remote vehicle 124C . . . and an Nth remote vehicle 124N (herein "the remote vehicle 124" if singular, or "the remote vehicles 124" if plural); and a digital twin server 107. These elements may be communicatively coupled to one another via a network 105. Although one ego vehicle 123, one digital twin server 107, and one network 105 are depicted in FIG. 1, in practice the operating environment 100 may include one or more ego vehicles 123, one or more digital twin servers 107, or one or more networks 105. The operating environment 100 includes "N" number of remote vehicles 124 where "N" indicates any positive whole number greater than one.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

The network 105 may include one or more communication channels shared among two or more of the ego vehicle 123, the remote vehicle 124, and the digital twin server 107. The communication channel may include DSRC, LTE-V2X, full-duplex wireless communication or any other wireless communication protocol. For example, the network 105 may be used to transmit a DSRC message, a DSRC probe, a Basic Safety Message (BSM) or a full-duplex message including any of the data described herein.

The ego vehicle 123 is any type of connected vehicle. For example, the ego vehicle 123 is one of the following types of vehicles: a car; a truck; a sports utility vehicle; a bus; a semi-truck; a drone or any other roadway-based conveyance.

In some embodiments, the ego vehicle 123 is an autonomous vehicle or a semi-autonomous vehicle. For example, the ego vehicle 123 includes an ADAS system set 180. The ADAS system set 180 includes one or more ADAS systems. The ADAS system set 180 provides sufficient autonomous features to the ego vehicle 123 to render the ego vehicle 123 an autonomous vehicle.

The National Highway Traffic Safety Administration (NHTSA) has defined different "levels" of autonomous vehicles, e.g., Level 0, Level 1, Level 2, Level 3, Level 4, and Level 5. If a vehicle such as the ego vehicle 123 or the remote vehicle 124 has a higher-level number than another vehicle (e.g., Level 3 is a higher-level number than Levels 2 or 1), then the vehicle with a higher-level number offers a greater combination and quantity of autonomous features relative to the vehicle with the lower level number. The different levels of autonomous vehicles are described briefly below.

Level 0: The ADAS system set 180 installed in the ego vehicle 123 has no vehicle control but may issue warnings to the driver of the ego vehicle 123.

Level 1: The driver must be ready to take control of the ego vehicle 123 at any time. The ADAS system set 180 installed in the ego vehicle 123 may provide autonomous features such as one or more of the following ADAS systems: an ACC; and Parking Assistance with automated steering and LKA Type II, in any combination.

Level 2: The driver is obliged to detect objects and events in the roadway environment and respond if the ADAS system set 180 installed in the ego vehicle 123 fail to respond properly (based on the driver's subjective judgement). The ADAS system set 180 installed in the ego vehicle 123 executes accelerating, braking, and steering. The ADAS system set 180 installed in the ego vehicle 123 can deactivate immediately upon takeover by the driver.

Level 3: Within known, limited environments (such as freeways), the driver can safely turn their attention away from driving tasks but must still be prepared to take control of the ego vehicle 123 when needed.

Level 4: The ADAS system set 180 installed in the ego vehicle 123 can control the ego vehicle 123 in all but a few environments such as severe weather. The driver must enable the automated system (which is comprised of the ADAS system set 180 installed in the ego vehicle 123) only when it is safe to do so. When the automated system is enabled, driver attention is not required for the ego vehicle 123 to operate safely and consistent with accepted norms.

Level 5: Other than setting the destination and starting the system, no human intervention is required. The automated system can drive to any location where it is legal to drive and make its own decision (which may vary based on the jurisdiction where the ego vehicle 123 is located).

In some embodiments, one or more of the ego vehicle 123 and the remote vehicle 124 is a Highly Autonomous Vehicle ("HAV" if singular, or "HAVs" if plural). An HAV is a vehicle (e.g., the DSRC-enabled ego vehicle) that includes an ADAS system set 180 that operates at Level 3 or higher as described and above, or as defined by the NHTSA on page 9 of their policy paper entitled "Federal Automated Vehicles Policy: Accelerating the Next Revolution in Roadway Safety," which was published in September of 2016.

In some embodiments, the ego vehicle 123 includes one or more of the following elements: a processor 125A; a memory 127A; a communication unit 145A; an ADAS system set 180; a sensor set 195; an ECU 126; an electronic display device 140; and a twin client 196. These elements of the ego vehicle 123 are communicatively coupled to one another via a bus 120A. Although only one of each of these elements are depicted in FIG. 1, in practice the ego vehicle 123 may include one or more processors 125A, one or more memories 127A, one or more communication units 145A, one or more ADAS system sets 180, one or more sensor sets 195, one or more ECUs 126, one or more electronic displays 140, and one or more twin clients 196.

The digital twin server 107 is a processor-based computing device. For example, the digital twin server 107 may include one or more of the following types of processor-based computing devices: a personal computer; a laptop; a mainframe; or any other processor-based computing device that is operable to function as a server. The digital twin server 107 may include a hardware server.

In some embodiments, the digital twin server 107 includes one or more of the following elements: a processor 125B; a memory 127B; a communication unit 145B; and a digital behavioral twin system 199. These elements of the digital twin server 107 are communicatively coupled to one another via a bus 120B.

The processor 125A of the ego vehicle 123 and the processor 125B of the digital twin server 107 may be referred to herein collectively or individually as the "processor 125" since, for example, the processor 125A of the ego vehicle 123 provides similar functionality to the components of the ego vehicle 123 as does the processor 125B of the digital twin server 107. For similar reasons, the description provided herein uses the following terms when referring to elements that are common to the ego vehicle 123, the digital twin server 107 or the remote vehicles 124: the "memory 127" when referring to the memory 127A and the memory 127B, collectively or individually; and the "communication unit 145" when referring to the communication unit 145A, the communication unit 145B, the communication unit 145C, the communication unit 145D, the communication unit 145E, and the communication unit 145N, collectively or individually.

The ego vehicle 123 and the digital twin server 107 are now separately described.

Vehicle 123

In some embodiments, the processor 125 and the memory 127 may be elements of an onboard vehicle computer system of the ego vehicle 123. The onboard vehicle computer system may be operable to cause or control the operation of one or more of the following elements: one or more ADAS systems included in the ADAS system set 180; the sensor set 195; the communication unit 145; the processor 125; the memory 127; the ECU 126; the electronic display device 140; and the twin client 196. The onboard vehicle computer system may be operable to access and execute the data stored on the memory 127 to provide the functionality described herein for the twin client 196. The onboard vehicle computer system may be operable execute the twin client 196 which causes the onboard vehicle computer system to execute one or more of the steps of one or more of the following: the method 300 described below with reference to FIG. 3; the method 500 described below with reference to FIGS. 5A and 5B; the method 600 described below with reference to FIG. 6; and the method 700 described below with reference to FIG. 7.

The ADAS system set 180 includes one or more ADAS systems. The ADAS systems provide one or more autonomous features to the ego vehicle 123. In some embodiments, the ego vehicle 123 is an autonomous vehicle, a semi-autonomous vehicle, or an HAV. For example, the ego vehicle 123 includes an ADAS system set 180 that provide autonomous features to the ego vehicle 123 which are sufficient to render the ego vehicle 123 an autonomous vehicle.

The ADAS system set 180 includes one or more of the following elements: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a lane keep assistant); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or "ADAS functionality," respectively. The features and functionality provided by these example ADAS systems are also referred to herein as an "autonomous feature" or an "autonomous functionality," respectively.

In some embodiments, twin client 196 of the ego vehicle 123 performs a risk analysis and determines that a collision involving a remote vehicle 124 is likely. In some embodiments, the twin client 196 determines modification data responsive to the risk analysis. The modification data is digital data that is operable to modify the operation of an ADAS system of the ego vehicle 123 so that an autonomous feature provided by the ADAS system is modified in a way that is operable to lower the risk of collision involving the remote vehicle 124. For example, the modification data modifies the operation of the ADAS system so that the autonomous feature causes the operation of the ego vehicle 123 to be less risky relative to the operation of the ego vehicle 123 prior to modifying the operation of the ADAS system based on the modification data. The modification data is described in more detail below according to some embodiments.

The sensor set 195 includes any onboard vehicle sensors of the ego vehicle 123 which monitor the roadway environment of the ego vehicle 123, whether internally or externally. In some embodiments, the sensor set 195 may include any onboard vehicle sensors in the ego vehicle 123 that generate sensor data 191 during a journey. The sensor data 191 describes the measurements of the roadway environment that are recorded by the onboard vehicle sensors that are included in the sensor set 195. In some embodiments, the sensor set 195 of the ego vehicle 123 includes one or more of the following onboard vehicle sensors: a vibrometer; a collision detection system; an engine oil pressure detection sensor; a camera (e.g., one or more of an internal camera and an external camera); a biometric sensor; a LIDAR sensor; an ultrasonic sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, one or more of the sensor data 191 and the ADAS data 192 describe behavior metrics. The behavior metrics are now described in more detail according to some embodiments. Hard braking and hard acceleration is a driver event when more force than normal is applied to the brake pedal or the accelerator pedal of the ego vehicle 123, respectively. Either type of behavior is correlated with increased risk of accidents and unsafe driving. The behavior metrics that describes the driver's behavior at intersections describes one or more of the following: whether the driver actually stop at intersections (versus, e.g., a rolling stop); whether the driver actually slows down for illuminated yellow lights (e.g., the illuminated yellow light of a traffic signal or a flashing yellow light of a street sign or cross walk signal); how the driver behaves at four-way stop signs; and how the driver handles merge situations. The behavior metrics that describes the dangerous interactions with other vehicles describes, for example, near-miss accidents with other vehicles, whether other vehicles had to swerve to avoid a collision with the ego vehicle 123, whether other vehicles had to hard brake or hard accelerate to avoid a collision with the ego vehicle 123, how closely the driver of the ego vehicle 123 follows behind other vehicles, whether the driver passes other vehicles on a double yellow line, and other dangerous interactions with other vehicles.

In some embodiments, the twin client 196 receives the sensor data 191 generated by these onboard vehicle sensors included in the sensor set 195 via the bus 120A. The sensor data 191 is digital data that describes the sensor measurements recorded by these onboard vehicle sensors. In some embodiments, the sensor data 191 are inputted to the ADAS systems included in the ADAS system set 180 so that they may provide their functionality. For example, the ADAS systems perceive the environment of the ego vehicle 123 and determine vehicular responses to the environment. The ADAS data 192 is digital data that describes one or more of the following: the analysis of the ADAS systems based on the sensor data 191; and the vehicular responses determined by the ADAS systems to be appropriate to the environment that is described by the sensor data 191.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 (or some other device such as the digital twin server 107) a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

The memory 127 of the ego vehicle 123 stores one or more of the following types of digital data: the sensor data 191; the ADAS data 192; a set of twin data 181; the estimation data 184; the risk data 183; and the AR data 182.

The sensor data 191 and the ADAS data 192 are described above, and so, those descriptions will not be repeated here. In some embodiments, the twin client 196 aggregates instances of sensor data 191 and ADAS data 192. The twin client 196 generates a wireless message that includes the sensor data 191 and the ADAS data 192 as a payload for the wireless message. The twin client 196 causes the communication unit 145 of the ego vehicle 123 to transmit the wireless message to the digital twin server 107 via the network. In this way, the digital behavioral twin system 199 of the digital twin server 107 has access to the sensor data 191 and the ADAS data 192 of the ego vehicle 123. In some embodiments, the twin client 196 repeats this process of reporting the sensor data 191 and the ADAS data 192 to the digital behavioral twin system 199 on a periodic basis. The remote vehicles 124 also include a twin client 196 that reports sensor data 191 and ADAS data 192 of the remote vehicles 124 to the digital twin server 107. In this way, the digital behavioral twin system 199 of the digital twin server 107 has access to sensor data 191 and ADAS data 192 of the remote vehicles 124 as well as sensor data 191 and ADAS data 192 of the ego vehicle 123.

In some embodiments, the digital behavioral twin system 199 includes code and routines that are operable, when executed by the processor 125 of the digital twin server 107, to use the sensor data 191 and the ADAS data 192 of a particular vehicle (e.g., the ego vehicle 123) to generate a digital behavioral twin for that particular vehicle. The digital behavioral twin for a particular vehicle (e.g., the ego vehicle 123) describes, for example: (1) different driving scenarios and how the driver of that particular vehicle would respond in these driving scenarios; and (2) different complex patterns of behavior for the driver of this particular vehicle that are inherently difficult to predict. Twin data is digital data that describes a digital behavioral twin for a particular vehicle, i.e., the digital behavioral twin for a particular driver of that particular vehicle. For example, ego twin data 175 is digital data that describes the digital behavioral twin for the ego vehicle 123 (i.e., the digital behavioral twin of the ego driver of the ego vehicle 123). First twin data 171 is digital data that describes the digital behavioral twin for the first remote vehicle 124A. Second twin data 172 is digital data that describes the digital behavioral twin for the second remote vehicle 124B. Third twin data 173 is digital data that describes the digital behavioral twin for the third remote vehicle 124C. Nth twin data 175 is digital data that describes the digital behavioral twin for the Nth remote vehicle 124N.

In some embodiments, the digital behavioral twin system 199 includes code and routines that are operable to transmit one or more of the ego twin data 175, the first twin data 171, the second twin data 172, the third twin data 173, and the Nth twin data 175 to the ego vehicle 123. For example, the twin client 196 of the ego vehicle 123 transmits the sensor data 191 and the ADAS data 192 for the ego vehicle 123 to the digital twin server 107. The digital behavioral twin system 199 determines that the remote vehicles 124 are geographically proximate to the ego vehicle 123 based on GPS information included in the sensor data 191 and then provides the ego twin data 175, the first twin data 171, the second twin data 172, the third twin data 173, and the Nth twin data 175 to the ego vehicle 123 via the network 105. In this way, the twin client 196 has access to the twin data for the ego vehicle 123 as well as the remote vehicles 124.

The set of twin data 181 includes digital data that describes the digital behavioral twins of the ego vehicle 123 and the remote vehicles 124. The digital behavioral twin system 199 determines the twin data based on the sensor data 191 and the ADAS data 192 for each of the ego vehicle 123 and the remote vehicles 124. In some embodiments, an instance of twin data includes all the digital data that is necessary to generate a particular digital twin. In some embodiments, an instance of twin data includes model parameters for the digital twin described by the twin data.

In some embodiments, the twin client 196 includes code and routines that are operable, when executed by the processor 125 of the ego vehicle 123, to cause the processor 125 to generate a first estimate of the future behavior of the remote drivers in different contexts [i.e., different driving scenarios] based on: the digital behavioral twins of the remote drivers as described by the twin data; and onboard data (e.g., one or more of the sensor data 191 and the ADAS data 192) of the ego vehicle 123 that describes (1) the current driving contexts and (2) the remote drivers' patterns of behavior and how the remote drivers behave in different contexts. This first estimate is described by the estimate data 184.

In some embodiments, the twin client 196 includes code and routines that are operable, when executed by the processor 125 of the ego vehicle 123, to cause the processor 125 to generate a second estimate of the future behavior of the ego driver in the different contexts based on: the digital behavioral twin of the ego driver; and onboard data of the ego vehicle that describes (1) the current driving contexts and (2) the ego driver's patterns of behavior and how the ego driver behaves in different contexts. This second estimate is also described by the estimate data 184.

Accordingly, the estimate data 184 is digital data that describes: (1) the first estimate of the future behavior of the remote drivers in different contexts [i.e., different driving scenarios]; and (2) the second estimate the future behavior of the ego driver in the different contexts that correspond to the contexts of the first estimate.

In some embodiments, the twin client 196 includes code and routines that are operable, when executed by the processor 125 of the ego vehicle 123, to cause the processor 125 to perform a risk analysis to estimate whether collisions are likely in different portions of the roadway currently being traveled by the ego vehicle 123 based in part on the estimated behaviors of the remote drivers and the ego driver as described by the first estimate and the second estimate. The results of the risk analysis are described by the risk data 183. Accordingly, the risk data 183 includes digital data that describes an estimate of whether a collision is likely in different portions of the roadway currently being traveled by the ego vehicle 123 based on the first estimate and the second estimate.

In some embodiments, the twin client 196 includes code and routines that are operable, when executed by the processor 125 of the ego vehicle 123, to cause the processor 125 to generate modification data based on the risk data 183. The modification data is digital data that describes modifications for one or more ADAS systems of the ego vehicle 123 such as those included on the ADAS system set 180. In some embodiments, the modification data is digital data that is operable to modify the operation of one or more ADAS systems of the ego vehicle 123 so that the operation of the ego vehicle 123 is less risky because the one or more ADAS systems of the ego vehicle 123 are modified to mitigate the risk posed by a driver's behavior. For example, the modification data controls the operation of the ego vehicle 123 so that the ego vehicle 123 does not collide with another object such as a remote vehicle 124.

Figure 8:
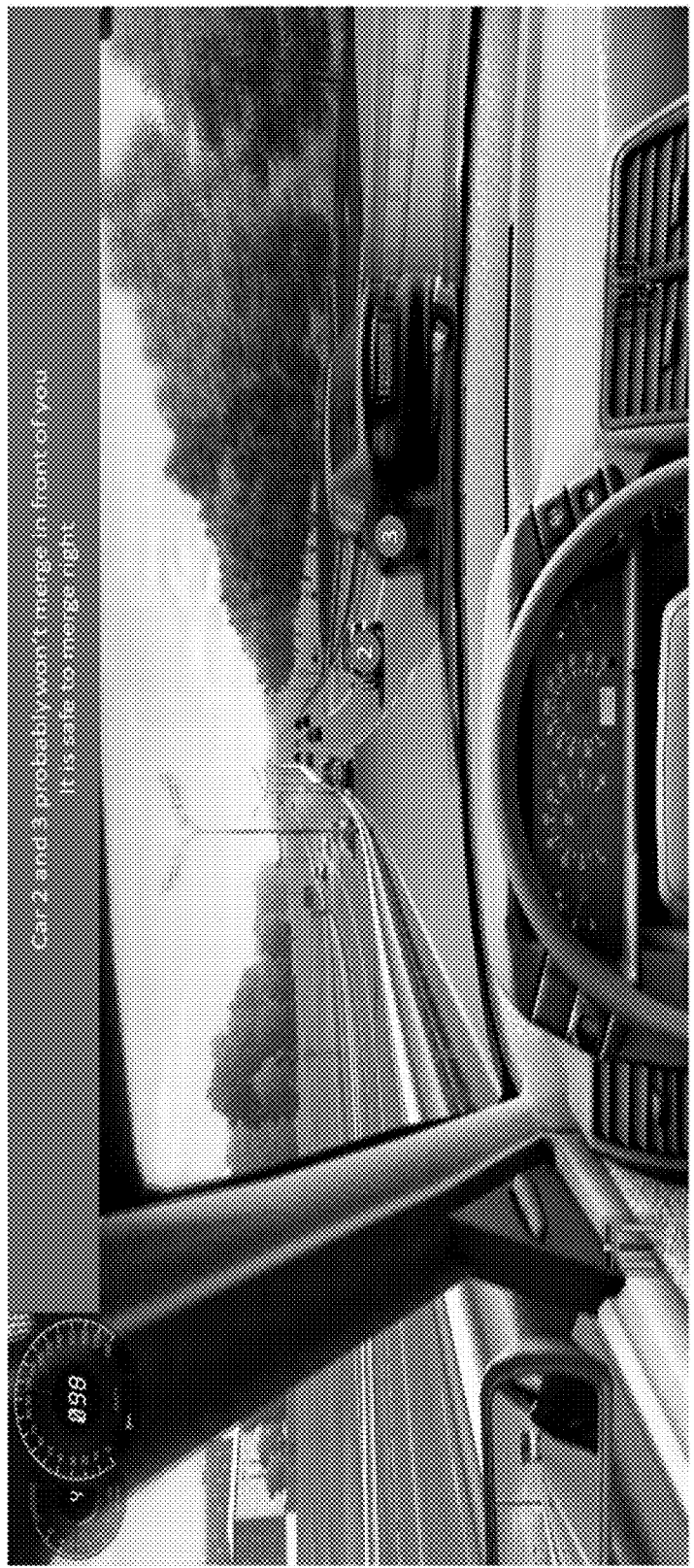
FIG. 8 includes a block display of an example of an electronic display overlaying a windshield of an ego vehicle displaying a risk gradient depicting a risk posed by remote vehicle according to some embodiments.
Figure 9:
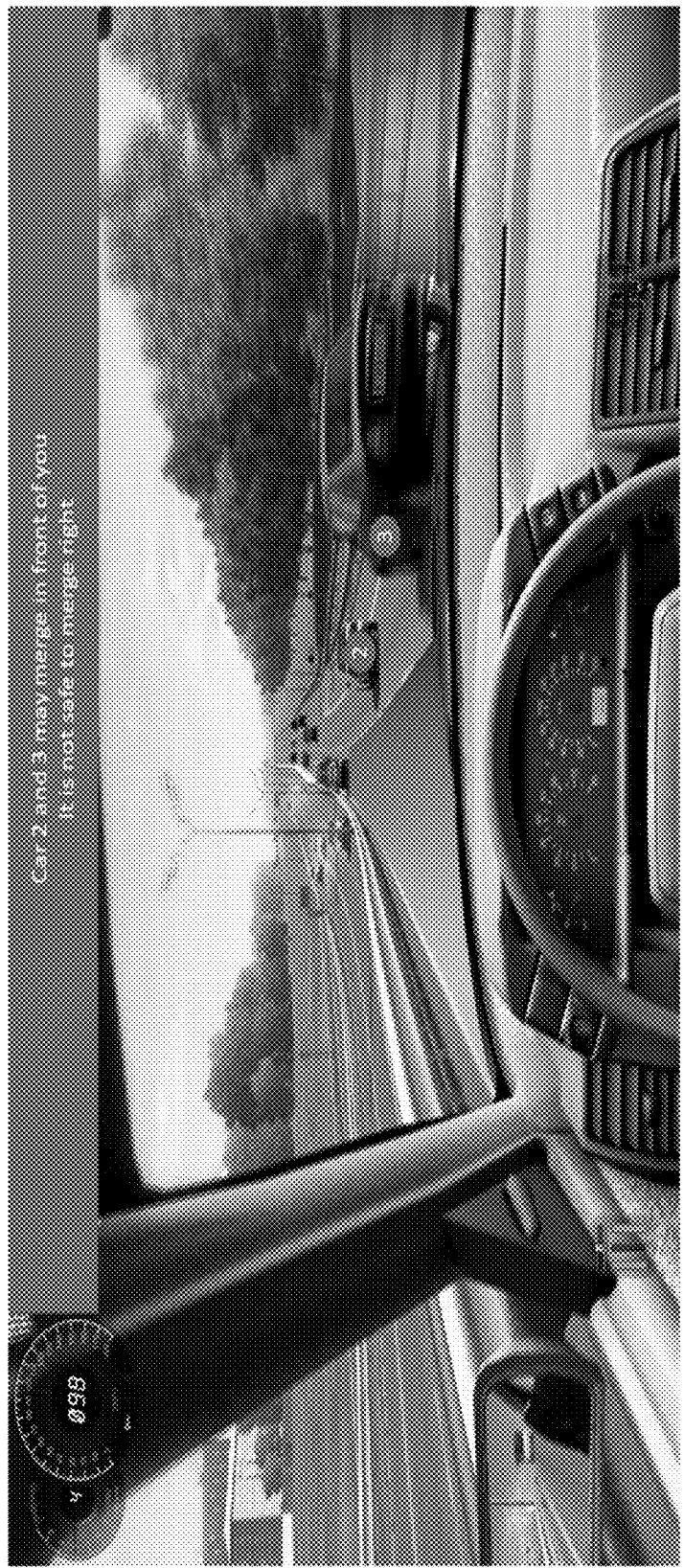
FIG. 9 includes a block display of an example of an electronic display overlaying a windshield of an ego vehicle displaying a risk gradient depicting a risk posed by remote vehicle according to some embodiments.

The AR data 182 is digital data that describes a visualization that visually depicts the risk described by the risk data 183. For example, the twin client 196 includes code and routines that are operable, when executed by the processor 125 of the ego vehicle 123, to cause the processor 125 to generate an AR visualization that visually depicts the likelihood of collision for the different portions of the roadway based on the risk analysis. The AR data 182 is digital data that describes the AR visualization. Examples of the AR visualizations are depicted in FIGS. 8 and 9 according to some embodiments.

The ECU 126 is an onboard vehicle computer of the ego vehicle 123. For example, the ECU 126 is a conventional ECU that stores and executes the twin client 196. One or more of the processor 125 and the memory 127 may be elements of the ECU 126.

The electronic display device 140 includes an electronic display of the ego vehicle 123. For example, the electronic display device 140 is a HUD, a 3D-HUD, a head unit display, or a dash meter. In some embodiments, the electronic display device 140 is a transparent HUD that overlays the entire front windshield of the ego vehicle 123 or substantially all of the front windshield of the ego vehicle 123.

In some embodiments, the electronic display device 140 is an electronic display panel that is operable to display graphical visualizations or other visual information. For example, the electronic display device 140 is a monitor, a television, a touchscreen, or some other electronic device that is operable to display visual information for viewing by a human user. In some embodiments, the electronic display device 140 displays one or more of the notifications described herein In some embodiments, the electronic display device is a pair of AR goggles. may include AR goggles that are any conventional AR goggles, goggles, or glasses. Examples of the AR goggles include one or more of the following types of AR goggles: Google™ Glass; CastAR; Moverio BT-200; Meta; Vuzix M-100; Laster SeeThru; Icis; Optinvent ORA-S; GlassUP; Atheer One; K-Glass; and Microsoft™ Hololens.

In some embodiments, the twin client 196 includes code and routines that are operable, when executed by a processor 125 of the ego vehicle 123, to cause the processor 125 to execute one or more of the steps of the method 300 depicted in FIG. 3. For example, the twin client 196 includes code and routines that are operable, when executed by the ECU 126 of an ego vehicle 123, to cause the ECU 126 to execute one or more of the following steps: (1) estimate the future behavior of the remote drivers in different contexts [i.e., different driving scenarios] based on: the digital behavioral twins of the remote drivers; and onboard data (e.g., one or more of the sensor data and the ADAS data) of the ego vehicle 123 that describes (a) the current driving contexts and (b) the remote drivers' patterns of behavior and how the remote drivers behave in different contexts; (2) estimate the future behavior of the ego driver in the different contexts based on: the digital behavioral twin of the ego driver; and onboard data of the ego vehicle 123 that describes (a) the current driving contexts and (b) ego driver's patterns of behavior and how the ego driver behaves in different contexts; (3) perform a risk analysis to predict whether collisions are likely in different portions of the roadway currently being traveled by the ego vehicle based in part on the estimated future behaviors of the remote drivers and the estimated future behavior of the ego driver; (4) generate an AR visualization that visually depicts the likelihood of collision for the different portions of the roadway based on the risk analysis; and (5) use the sensor data 191 generated by the ego vehicle's onboard sensors to detect the behavior of the remote vehicles 124 and update the locally stored digital behavioral twins for the remote drivers as well as the estimated future behaviors of the remote drivers and the risk assessments for the remote drivers. In some embodiments, one or more of steps (1) through (4) are executed before the onboard sensors of the ego vehicle 123 ever monitor the remote vehicles 124 (e.g., observe the behavior of the remote vehicle 124). Because of this, the twin client 196 is operable to provide risk notifications more quickly than the existing solutions.

In some embodiments, the twin client 196 includes code and routines that are operable, when executed by a processor 125 of the ego vehicle 123, to cause the processor 125 to execute one or more of the steps of the method 500 depicted in FIGS. 5A and 5B. In some embodiments, the twin client 196 includes code and routines that are operable, when executed by the processor 125, to cause the processor 125 to execute one or more of the steps of the method 600 depicted in FIG. 6. In some embodiments, the twin client 196 includes code and routines that are operable, when executed by the processor 125, to cause the processor 125 to execute one or more of the steps of the method 700 depicted in FIG. 7.

In some embodiments, the twin client 196 of the ego vehicle 123 may be implemented using hardware including a field-programmable gate array ("FPGA") or an application-specific integrated circuit ("ASIC"). In some other embodiments, the twin client 196 may be implemented using a combination of hardware and software.

The twin client 196 is described in more detail below with reference to FIGS. 2-10.

In some embodiments, one or more of the sensor data 191 and the ADAS data 192 describes a vehicle component of the ego vehicle 123. For example, the ego vehicle 123 includes a set of components and one or more of the sensor data 191 and the ADAS data 192 describes a state or condition of one or more of these vehicle components. The ego vehicle 123 may include sensors that are operable to measure the information about these vehicle components which is described by the sensor data 191 and the ADAS data 192.

In some embodiments, example vehicle components include one or more of the following: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; a powertrain component; and a belt.

Examples of vehicle components being measured are described in U.S. patent application Ser. No. 15/363,368 filed on Nov. 29, 2016 and entitled "Optimization of a Vehicle to Compensate for Water Contamination of a Fluid of a Vehicle Component," the entirety of which is hereby incorporated by reference.

A remote vehicle 124 is a connected vehicle similar to the ego vehicle 123. In some embodiments, the remote vehicles 124 include elements that are similar to those described above for the ego vehicle 123. Accordingly, those descriptions will not be repeated here.

Digital Twin Server 107

In some embodiments, the digital twin server 107 is a cloud server that includes one or more of the following elements: a digital behavioral twin system 199; a processor 125; a memory 127; and a communication unit 145. These elements are communicatively coupled to one another via the bus 120B. The following elements of the digital twin server 107 are the same or similar to those described above for the ego vehicle 123, and so, the descriptions of these elements will not be repeated here: the processor 125; the memory 127; and the communication unit 145.

The memory 127 of the digital twin server 107 stores one or more of the following elements: the first twin data 171; the second twin data 172; the third twin data 173; the Nth twin data 174; and the ego twin data 175. These elements of the memory 127 of the digital twin server 107 were described above with reference to the memory 127 of the ego vehicle 123, and so, those descriptions will not be repeated here.

The digital behavioral twin system 199 includes code and routines that are operable, when executed by the processor 125 of the digital twin server 107, to receive instances of sensor data 191 and ADAS data 192 from one or more vehicles (e.g., the ego vehicle 123 and the remote vehicles 124) and generate twin data for these particular vehicles based on the sensor data 191 and the ADAS data 192 that are received for these particular vehicles.

For example, the ego vehicle 123 transmits a wireless message to the digital twin server 107 via the network that includes the following digital data as a payload: the sensor data 191; the ADAS data 192; and digital data describing a unique identifier of the ego vehicle 123 (e.g., a vehicle identification number (VIN number) for the ego vehicle 123). The digital behavioral twin system 199 includes code and routines that are operable, when executed by the processor 125 of the digital twin server 107, to cause the processor 125 to generate a digital behavioral twin for the ego vehicle 123 (or a driver of the ego vehicle 123) based on this digital data. This digital behavioral twin is described by the ego twin data 175. The digital behavioral twin system 199 receives multiple wireless messages from multiple vehicles, each including a combination of sensor data 191, ADAS data 192, and digital describing a unique identifier of the vehicle that originated the wireless message.

In some embodiments, the digital behavioral twin system 199 uses the digital data describing the unique identifiers of the vehicles as a way of organizing the payloads for the wireless messages so that the digital behavioral twin system 199 is able to generate one or more of the following: the first twin data 171 for the first remote vehicle 124A using the payload of the wireless message that originated from the first remote vehicle 124A; the second twin data 172 for the second remote vehicle 124B using the payload of the wireless message that originated from the second remote vehicle 124B; the third twin data 173 for the third remote vehicle 124C using the payload of the wireless message that originated from the third remote vehicle 124C; the Nth twin data 174 for the Nth remote vehicle 124N using the payload of the wireless message that originated from the Nth remote vehicle 124N; and the ego twin data 175 for the ego vehicle 123 using the payload of the wireless message that originated from the ego vehicle 123.

In some embodiments, a combination of sensor data 191 and ADAS data 192 received from a particular vehicle is referred to as "onboard data." The wireless message that includes this onboard data also includes digital data that describes a unique identifier of the vehicle that transmitted the wireless message. The digital behavioral twin system 199 receives multiple wireless messages from multiple vehicles and organizes the various instances of onboard data in the memory 127 of the digital twin server 107 based on the unique identifiers. In this way, instances of onboard data are stored in a memory 127 in an organized manner based on the identity of the particular vehicle that transmitted the wireless message that included the instances of the onboard data.

In some embodiments, the digital behavioral twin system 199 includes code and routines that are operable to analyze the onboard data for a particular vehicle (i.e., the onboard data transmitted by a particular vehicle) and determine the behavior of the particular vehicle, or the driver of the particular vehicle, in one or more contexts or driving scenarios. The behavior of the driver is described by the onboard data; the one or more contexts or driving scenarios are also described by the onboard data. The digital behavioral twin system 199 receives the onboard data for the particular vehicle as an input and outputs twin data for the particular vehicle as an output responsive to this input. This twin data describes the digital behavioral twin for this particular vehicle. For example, the digital behavioral twin system 199 executes a process including one or more of the following steps: (1) receive the onboard data of the ego vehicle 123 as an input; (2) analyzes this input to determine the behavior of the ego vehicle 123, or the ego driver, in one or more contexts or driving scenarios; and (3) output the ego twin data 175 that describes the behavior of the ego vehicle 1234, or the ego driver, in the one or more contexts or driving scenarios. The digital behavioral twin system 199 repeats this process for the other vehicles that provide onboard data to the digital behavioral twin system 199. In this way, the digital behavioral twin system 199 outputs one or more of the following instances of digital data: the first twin data 171; the second twin data 172; the third twin data 173; and the Nth twin data 174.

In some embodiments, the digital behavioral twin system 199 includes code and routines that are operable, when executed by the processor 125 of the digital twin server 107, to cause the processor 125 to execute one or more steps of the method 500 described below with reference to FIGS. 5A and 5B.

In some embodiments, the digital behavioral twin system 199 generates a digital behavioral twin using one or more of the methods, processes or functionalities described in U.S. patent application Ser. No. 16/007,693 filed on Jun. 13, 2008 and entitled "Digital Twin for Vehicle Risk Evaluation," the entirety of which is herein incorporated by reference.

In some embodiments, the digital behavioral twin system 199 includes a modeling application and a game engine. Examples of modeling applications and game engines used in some of the embodiments described herein are described in U.S. patent application Ser. No. 15/135,135 filed on Apr. 21, 2016 and entitled "Wind Simulation Device," the entirety of which is hereby incorporated by reference. See, for example, the "virtual simulation tool" described in U.S. patent application Ser. No. 15/135,135. Embodiments of this technology are also discussed in U.S. patent application Ser. No. 15/074,842 filed on Mar. 18, 2016 and entitled "Vehicle Simulation Device for Crowd-Sourced Vehicle Simulation Data," the entirety of which is hereby incorporated by reference. Embodiments of this technology are also discussed in U.S. patent application Ser. No. 15/085,644 filed on Mar. 30, 2016 and entitled "Dynamic Virtual Object Generation for Testing Autonomous Vehicles in Simulated Driving Scenarios," the entirety of which is hereby incorporated by reference. One or more of the digital behavioral twin system 199 and the twin client 196 described herein may be modified to include any of the elements described in U.S. patent application Ser. No. 15/135,135, U.S. patent application Ser. No. 15/085,644, and U.S. patent application Ser. No. 15/074,842.

In some embodiments, the digital behavioral twin system 199 of the digital twin server 107 may be implemented using hardware including a FPGA or an ASIC. In some other embodiments, the digital behavioral twin system 199 may be implemented using a combination of hardware and software. The digital behavioral twin system 199 may be stored in a combination of the devices (e.g., servers or other devices). The digital behavioral twin system 199 is described in more detail below with reference to FIGS. 2-10.

Figure 2:
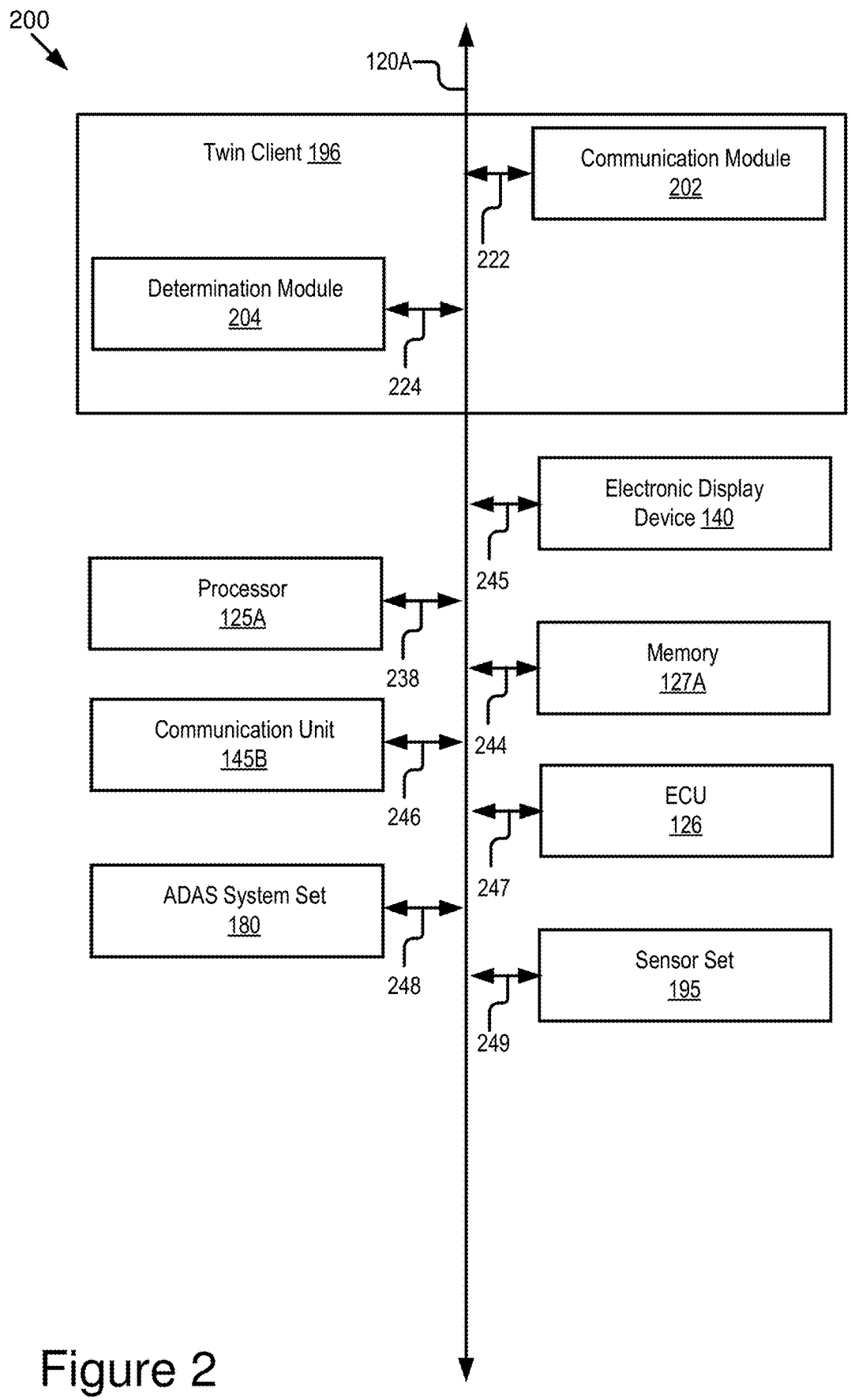
FIG. 2 is a block diagram illustrating an example computer system including the twin client according to some embodiments.

Referring now to FIG. 2, depicted is a block diagram illustrating an example computer system 200 including a digital behavioral twin system 199 according to some embodiments.

In some embodiments, the computer system 200 may include a special-purpose computer system that is programmed to perform one or more steps of a method 300 described below with reference to FIG. 3. In some embodiments, the computer system 200 may include a special-purpose computer system that is programmed to perform one or more steps of a method 500 described below with reference to FIGS. 5A and 5B. In some embodiments, the computer system 200 may include a special-purpose computer system that is programmed to perform one or more steps of a method 600 described below with reference to FIG. 6. In some embodiments, the computer system 200 may include a special-purpose computer system that is programmed to perform one or more steps of a method 700 described below with reference to FIG. 7.

In some embodiments, the computer system 200 is an element the digital twin server 107.

In some embodiments, the digital behavioral twin system 199 is an element of the ego vehicle 123. In some embodiments, the computer system 200 may be an onboard vehicle computer of the ego vehicle 123. In some embodiments, the computer system 200 may include an ECU, head unit or some other processor-based computing device of the ego vehicle 123.

The computer system 200 may include one or more of the following elements according to some examples: the digital behavioral twin system 199; the processor 125; the communication unit 145; the memory 127; the electronic display device 140; the ECU 126; the ADAS system set 180; and the sensor set 195. The components of the computer system 200 are communicatively coupled by the bus 120A.

In the illustrated embodiment, the processor 125 is communicatively coupled to the bus 120A via a signal line 238. The communication unit 145 is communicatively coupled to the bus 120A via a signal line 246. The memory 127 is communicatively coupled to the bus 120A via a signal line 244. The electronic display device 140 is communicatively coupled to the bus 120A via a signal line 245. The ECU 126 is communicatively coupled to the bus 120A via a signal line 247. The ADAS system set 180 is communicatively coupled to the bus 120A via a signal line 248. The sensor set 195 is communicatively coupled to the bus 120A via a signal line 249.

The following elements of the computer system 200 were described above with reference to FIG. 1, and so, those descriptions will not be repeated here: the processor 125; the communication unit 145; the memory 127; the electronic display device 140; the ECU 126; the ADAS system set 180; and the sensor set 195.

The memory 127 may store any of the data described above with reference to FIGS. 1-10, or any other data described herein. The memory 127 may store any data necessary for the computer system 200 to provide its functionality.

In the illustrated embodiment shown in FIG. 2, the digital behavioral twin system 199 includes: a communication module 202; and a determination module 204.

The communication module 202 can be software including routines for handling communications between the digital behavioral twin system 199 and other components of the computer system 200. In some embodiments, the communication module 202 can be a set of instructions executable by the processor 125 to provide the functionality described below for handling communications between the digital behavioral twin system 199 and other components of the computer system 200 or the operating environment 100.

The communication module 202 sends and receives data, via the communication unit 145, to and from one or more elements of the operating environment 100. The communication module 202 may send or receive any of the data or messages described herein via the communication unit 145.

In some embodiments, the communication module 202 receives data from components of the digital behavioral twin system 199 and stores the data in the memory 127. In some embodiments, the communication module 202 may handle communications between components of the digital behavioral twin system 199.

In some embodiments, the communication module 202 can be stored in the memory 127 of the computer system 200 and can be accessible and executable by the processor 125. The communication module 202 is adapted for cooperation and communication with the processor 125 and other components of the computer system 200 via signal line 222.

The determination module 204 includes code and routines that are operable, when executed by the processor 125, to cause the processor 125 to execute one or more of the steps of the method 300 depicted in FIG. 3. For example, the determination module 204 includes code and routines that are operable, when executed by the processor 125, to cause the processor 125 to execute one or more of the following steps: (1) estimate the future behavior of the remote drivers in different contexts [i.e., different driving scenarios] based on the digital behavioral twins of the remote drivers (e.g., the first twin data, the second twin data, the third twin data . . . and the Nth twin data) and onboard data (e.g., one or more of the sensor data and the ADAS data) recorded by the ego vehicle that describes (a) the current driving contexts and (b) the remote drivers' patterns of behavior and how the remote drivers behave in different contexts; (2) estimate the future behavior of the ego driver in the different contexts based on the digital behavioral twin of the ego driver (e.g., the ego twin data) and onboard data recorded by the ego vehicle that describes (a) the current driving contexts and (b) ego driver's patterns of behavior and how the ego driver behaves in different contexts; (3) perform a risk analysis to predict whether collisions are likely in different portions of the roadway currently being traveled by the ego vehicle based in part on the estimated future behaviors of the remote drivers and the estimated future behavior of the ego driver; (4) generate an AR visualization that visually depicts the likelihood of collision for the different portions of the roadway based on the risk analysis; and (5) use the sensor data generated by the ego vehicle's onboard sensors (e.g., the sensor set 195) to detect the behavior of the remote vehicles and update the locally stored digital behavioral twins for the remote drivers as well as the estimated future behaviors of the remote drivers and the risk assessments for the remote drivers. In some embodiments, one or more of steps (1) through (4) are executed before the ego vehicle's onboard sensors ever monitor the remote vehicles (e.g., observe the remote vehicle's behavior). Because of this, the twin client 196 is operable to provide risk notifications more quickly than the existing solutions.

In some embodiments, the determination module 204 includes code and routines that are operable, when executed by the processor 125, to cause the processor 125 to execute one or more of the steps of the method 500 depicted in FIGS. 5A and 5B. For example, the determination module 204 includes code and routines that are operable, when executed by the processor 125, to cause the processor 125 to execute one or more of steps 501-506 and 509-514 of the method 500 depicted in FIGS. 5A and 5B.

Figure 6:
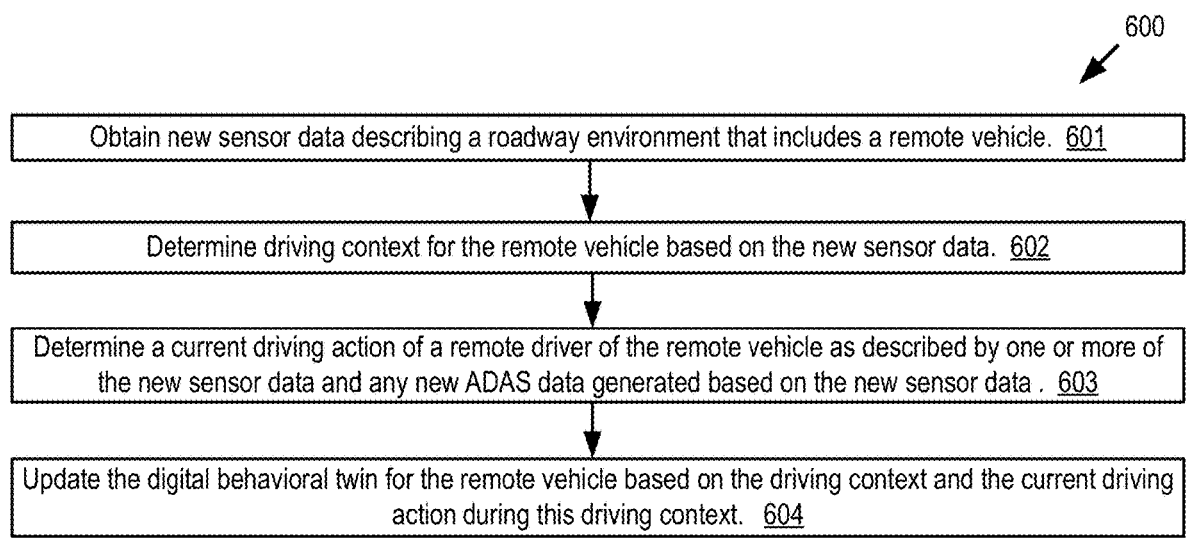
FIG. 6 includes a flowchart of an example method for updating a digital behavioral twin for a driver according to some embodiments.

In some embodiments, the determination module 204 includes code and routines that are operable, when executed by the processor 125, to cause the processor 125 to execute one or more of the steps of the method 600 depicted in FIG. 6.

Figure 7:
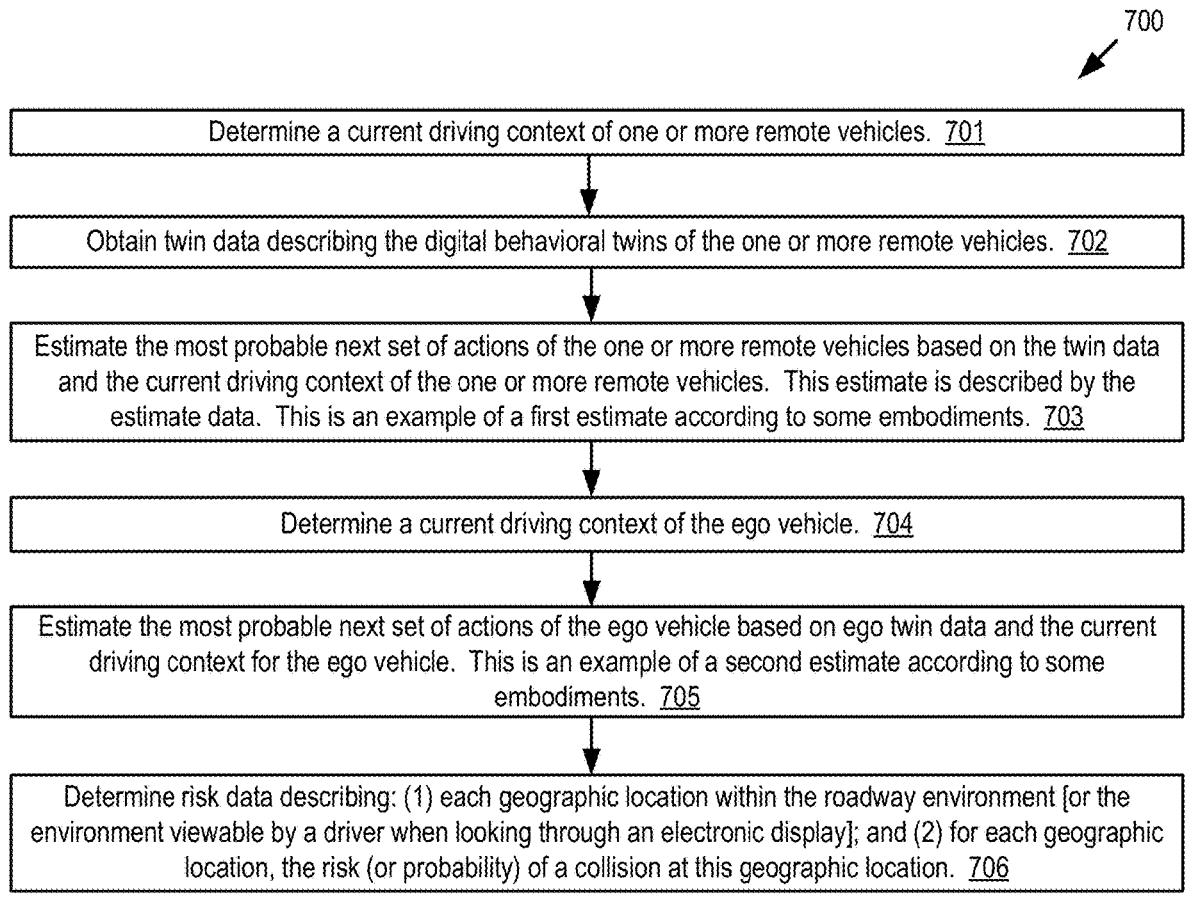
FIG. 7 includes a flowchart of an example method for determining risk data according to some embodiments.

In some embodiments, the determination module 204 includes code and routines that are operable, when executed by the processor 125, to cause the processor 125 to execute one or more of the steps of the method 700 depicted in FIG. 7.

In some embodiments, the determination module 204 includes an instance of the digital behavioral twin system 199 such that the determination module 204 is operable to provide the functionality described herein for the digital behavioral twin system 199.

In some embodiments, the determination module 204 can be stored in the memory 127 of the computer system 200 and can be accessible and executable by the processor 125. The determination module 204 is adapted for cooperation and communication with the processor 125 and other components of the computer system 200 via signal line 224.

Referring now to FIG. 3, depicted is a flowchart of an example method 300 for providing a digital twin service for a real-world vehicle according to some embodiments. For example, the digital twin service is provided to the ego vehicle. The digital twin service includes one or more steps of the method 300. One or more of the steps described herein for the method 300 may be executed by one or more computer systems 200. The steps of the method 300 may be executed in any order, and not necessarily the order depicted in FIG. 3. In some embodiments, one or more of the steps of the method 300 depicted in FIG. 3 are optional and not necessary to provide the digital twin service.

At step 303, the future behavior of the remote drivers in different contexts [i.e., different driving scenarios] is estimated based on one or more of the following: the digital behavioral twins of the remote drivers; and onboard data (e.g., one or more of the sensor data and the ADAS data) of the ego vehicle that describes (1) the current driving contexts and (2) the remote drivers' patterns of behavior and how the remote drivers behave in different contexts. In some embodiments, this estimate is described as the "first estimate."

At step 305, the future behavior of the ego driver in the different contexts is estimated based on one or more of the following: the digital behavioral twin of the ego driver; and onboard data of the ego vehicle that describes (1) the current driving contexts and (2) ego driver's patterns of behavior and how the ego driver behaves in different contexts. In some embodiments, this estimate is described as the "second estimate."

At step 307, a risk analysis is executed to predict whether collisions are likely in different portions of the roadway currently being traveled by the ego vehicle based in part on the estimated future behaviors of the remote drivers [i.e., the output of step 303] and the estimated future behavior of the ego driver [i.e., the output of step 305].

At step 308, an AR visualization is generated that visually depicts the likelihood of collision for the different portions of the roadway based on the risk analysis. In some embodiments, this AR visualization can be enhanced with audio notifications of collision risks. In some embodiments, the output of step 308 is the AR data.

At step 309, the onboard sensors of the ego vehicle are executed to detect the behavior of the remote vehicles and update the locally stored digital behavioral twins for the remote drivers as well as the estimated future behaviors of the remote drivers [i.e., step 303] and the risk assessments for the remote drivers [i.e., step 307]. In some embodiments, the twin clients of the remote vehicles also perform a step similar to step 309 so that they update their own locally stored information (e.g., their locally stored instances of twin data).

Referring to FIG. 4, depicted is a block diagram illustrating an electronic display device 140 in embodiments where the electronic display device 140 is a 3D HUD.

In some embodiments, the 3D HUD includes a projector 401, a movable screen 402, a screen-driving unit 403, an optical system (including lenses 404, 406, reflector 405, etc.). The projector 401 may be any kind of projector such as a digital mirror device (DMD) projector or a liquid crystal projector. The projector 401 projects an image (graphic) 408 on the movable screen 402. The image 408 may include a virtual object. For example, the image 408 may be a concealing graphic.

The movable screen 402 includes a transparent plate and so the light of the projected image transmits through the movable screen 402 to be projected on the windshield 407 of a vehicle (e.g., the ego vehicle 123). The image projected on the windshield 407 is perceived by a driver 410 as if it is a real object (shown as 411*a*, 411*b*) that exists in the three-dimensional space of the real-world, as opposed to an object that is projected on the windshield.

In some embodiments, the 3D HUD is operable to control the direction of the image relative to the driver 410 (in other words, the image position in the windshield) by adjusting the projection position on the screen 402. Further the screen 402 is movable by the screen-driving unit 403 in the range between the positions 403*a* and 403*b*. Adjusting the position of the screen 402 can vary the depth (distance) of the projected image from the driver 410 in the real-world. In one example, the movable range of the screen 402 (distance between positions 403*a* and 403*b*) may be 5 mm, which correspond to from 5 m away to infinity in the real-world.

The use of the 3D HUD allows the driver 410 to perceive the projected image exist in the real-world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D HUD depicted in FIG. 4 is provided by way of example. Other examples are possible. These examples may include heads-up displays having more or less complexity than the 3D HUD depicted in FIG. 4. For example, it is anticipated that in the future there will be heads-up displays that do not require movable parts such as the movable screen 402. For example, a static screen that does not move may be deployed. The heads-up display deployed may not be a two-dimensional heads-up display unit. In some embodiments, the electronic display device 140 and the concealing graphic are designed to be operable with such components.

Referring to FIGS. 5A and 5B, depicted is a flowchart of an example method 500 for providing a digital twin service according to some embodiments.

Referring to FIG. 5A, steps of the method 500 are now described with reference to the twin client of the ego vehicle and the digital behavioral twin system of the digital twin server. At step 501, the twin client causes the sensors of the ego vehicle to record the sensor data.

At step 502, the twin client provides the sensor data to the ADAS systems. For example, the twin client of the ego vehicle provides the sensor data recorded by the sensor set of the ego vehicle to one or more ADAS systems of the ego vehicle.

At step 503, the twin client executes the ADAS systems. For example, the twin client executes the one or more ADAS systems using the sensor data as an input. In this way, the sensor data provides information to the one or more ADAS systems that is used by the one or more ADAS systems to provide their functionality.

In some embodiments, the one or more ADAS systems determine events occurring in the roadway environment of the ego vehicle based on the sensor data and determine appropriate ADAS functionality or autonomous functionality to provide responsive to the events occurring in the roadway environment as described by the sensor data.

In some embodiments, the one or more ADAS systems generate ADAS data that describes, among other things, the ADAS functionality or autonomous functionality provided by the one or more ADAS systems. This ADAS data is provided by the one or more ADAS systems as an output responsive to the sensor data that is received as an input.

In some embodiments, the ADAS data is digital data describes the events occurring in the roadway environment as determined by the one or more ADAS systems based on the sensor data that is received as the input. In some embodiments, the events described by the ADAS data include different contexts (e.g., different driving scenarios) that are determined to be present in the roadway environment by the one or more ADAS systems based on the sensor data that is received by the one or more ADAS systems as an input at step 502.

At step 504, the twin client receives the ADAS data from the ADAS systems.

At step 505, the twin client monitors the sensor data and the ADAS data over time. For example, the sensor data changes over time as the onboard sensors record new sensor data. The twin client repeats steps 502, 503, and 504 using the new sensor data and, in this way, receives new ADAS data that is generated by the one or more ADAS systems based on the new sensor data.

In some embodiments, the new ADAS data describes new contexts or driving scenarios that are present in the roadway environment based on the new sensor data. At step 505, the twin client monitors the new sensor data and the new ADAS data that is generated over time. In some embodiments, the twin client stores the sensor data and the ADAS data, as well as the new sensor data and the new ADAS data, in a non-transitory memory of the ego vehicle.

In some embodiments, the "new sensor data" and the "new ADAS data" described herein are included in the "sensor data" and the "ADAS data" that are referred to in the following steps of the method 500.

In some embodiments, steps 501-505 of the method 500 are continuously repeated by the twin client even as other steps of the method 500 are executed in parallel with these steps of the method.

At step 506, the twin client causes the communication unit to transmit a wireless message including the sensor data and the ADAS data to the digital behavioral twin system via the network. In some embodiments, the sensor data and the ADAS data are collectively referred to as onboard data. The onboard data is associated with digital data that describes a unique identifier of the vehicle that transmits the wireless message of step 506. The wireless message includes, as a payload, the onboard data and the digital data that describes the unique identifier.

At step 507, the digital behavioral twin system builds the ego twin data and the twin data for the remote vehicles. For example, the digital behavioral twin system receives wireless messages from multiple vehicles (e.g., the ego vehicle and the remote vehicles) and builds twin data for each of these vehicles (e.g., the ego twin data, the first twin data . . . the Nth twin data). The digital behavioral twin system builds twin data for each of these vehicles based on the payload of the wireless messages that it receives from these vehicles. In this way, the digital behavioral twin system builds the ego twin data, the first twin data . . . and the Nth twin data.

At step 508, the digital behavioral twin system transmits the twin data to the ego vehicle and any remote vehicles that include a twin client and a communication unit. In some embodiments, the digital behavioral twin system transmits, to each of these vehicles, the twin data for each of the vehicles that are in its geographic proximity. For example, the ego vehicle receives the ego twin data and the twin data for any vehicles that are located within a predetermined distance from the ego vehicle (e.g., within 5 meters, 15 meters, 50 meters, 1 to 100 meters, or some other predetermined distance). In this way, the digital behavioral twin system builds a set of twin data for each vehicle based on the relative geographic locations of these vehicles and transmits the set of twin data to each vehicle.

At step 509, the twin client receives the twin data from the network. In some embodiments, the twin client stores the set of twin data in the non-transitory memory of the ego vehicle. In some embodiments, vehicles share their twin data with other vehicles via V2X or V2V communication, and the twin clients of individual vehicles receive the twin data for vehicles that are located within their geographic proximity using V2X or V2V communication instead of relying on the digital behavioral twin system to provide twin data for these vehicles.

Accordingly, the twin client of a particular vehicle (e.g., the ego vehicle) stores twin data describing the digital behavioral twins of itself as well as other vehicles that are located nearby the particular vehicle.

In some embodiments, steps 501-505 of the method 500 are continuously repeated by the twin client. In this way, the twin client of the particular vehicle also stores sensor data and ADAS data, the combination of which are described as "onboard data," that describes the current contexts or driving scenarios being experienced within its current roadway environment. In some embodiments, the sensor data describes remote drivers' patterns of behavior and the ego driver's pattern of behavior.

For example, the onboard sensors of the ego vehicle record the behaviors of the remote vehicles (thereby generating a first data set of sensor data describing these behaviors of the remote drivers), and over time the sensor data included in this first data set describes the remote drivers' patterns of behavior as described below in step 510; the twin data for the remote vehicles describes, among other things, how the remote drivers behave in different contexts, and these contexts are identifiable by the twin client based on the new sensor data recorded by the sensor set of the ego vehicle (see, e.g., step 510 and the generation of the first estimate). Similarly, the onboard sensors of the ego vehicle record the behavior of the ego vehicle (thereby generating a second data set of sensor data describing these behaviors of the ego driver), and over time this second data set describes the ego driver's patterns of behavior as described below in step 511; the ego twin data describes, among other things, how the ego driver behaves in different contexts which are identifiable by the twin client based on the new sensor data recorded by the sensor set of the ego vehicle (see, e.g., step 511 and the generation of the second estimate).

At step 510, the twin client generates a first estimate of the future behavior of the remote drivers in different contexts [i.e., different driving scenarios] based on: the digital behavioral twins of the remote drivers; and onboard data (e.g., one or more of the sensor data and the ADAS data) of the ego vehicle that describes (1) the current driving contexts and (2) the remote drivers' patterns of behavior and how the remote drivers behave in different contexts. This first estimate is described by the estimate data.

Referring to FIG. 5B, at step 511 the twin client generates a second estimate of the future behavior of the ego driver in the different contexts based on: the digital behavioral twin of the ego driver; and onboard data of the ego vehicle that describes (1) the current driving contexts and (2) ego driver's patterns of behavior and how the ego driver behaves in different contexts. This second estimate is also described by the estimate data along with the first estimate of step 510.

At step 512, the twin client performs a risk analysis using the estimate data describing the first estimate and the second estimate as an input. The output of this risk analysis is risk data that describes an estimate whether collisions are likely in different portions of the roadway currently being traveled by the ego vehicle based in part on the estimated behaviors of the remote drivers and the ego driver (e.g., based on the first estimate and the second estimate). An example of step 512 is described in more detail below with reference to method 700 of FIG. 7 according to some embodiments.

At step 513, the twin client causes an electronic display device to generate an AR visualization that visually depicts the likelihood of collision for the different portions of the roadway based on the risk analysis [this AR visualization can be paired with audio notifications of collision risks]. The AR data is digital data that describes the AR visualization. The twin client generates the AR data. For example, the twin client includes code and routines that are operable, when executed by a processor of the ego vehicle, to generate AR data that describes an AR visualization that depicts the risks that are described by the risk data.

Example embodiments of code and routines, such as those included in the twin client according to some embodiments, which are operable to generate visualizations (e.g., a roadway visualization system) are described in U.S. patent application Ser. No. 15/265,235 entitled "Scalable Curve Visualization for Conformance Testing in Vehicle Simulation" and filed on Sep. 14, 2016, the entirety of which is hereby incorporated by reference. Other example embodiments code and routines that are operable to generate visualizations (e.g., an automated dynamic object generation system) are described in U.S. patent application Ser. No. 15/085,664 entitled "Dynamic Virtual Object Generation for Testing Autonomous Vehicle in Simulated Driving Scenarios" and filed on Mar. 30, 2016, the entirety of which is hereby incorporated by reference. Yet other example embodiments of code and routines that are operable to generate visualizations (e.g., a realistic roadway virtualization system) are described in U.S. patent application Ser. No. 15/013,936 entitled "Realistic Roadway Virtualization System" and filed on Feb. 2, 2016, the entirety of which is hereby incorporated by reference.

At step 514, the twin client causes the onboard sensors of the ego vehicle to detect the behavior of the remote vehicles. The twin client updates the digital behavioral twins for the remote drivers as well as the estimates of the future behaviors of the remote drivers and risk assessments for the remote drivers based on the sensor data generated based on the detection of the behavior of the remote vehicles. For example, the twin client (e.g., the determination module of the twin client) includes a digital behavioral twin system and the twin client updates the twin data for different vehicles based on the observed behavior of these vehicles using the sensor data that is generated by the sensor set of the ego vehicle. An example of step 514 is described in more detail below with reference to method 600 of FIG. 6 according to some embodiments.

Referring to FIG. 6, depicted is a flowchart of an example method 600 for updating a digital behavioral twin for a driver according to some embodiments.

At step 601, new sensor data is generated. For example, the new sensor data describes measurements for a roadway environment that includes a remote vehicle. The method 600 generates a new or updated digital behavioral twin for this remote vehicle whose twin data is stored by the ego vehicle whose twin client executes the method 600.

At step 602, a driving context for the remote vehicle is determined based on the sensor data.

At step 603, a current driving action of a remote driver of the remote vehicle is determined. This current driving action is determined by one or more of the sensor data of step 601 or ADAS data that is generated by one or more ADAS systems of the ego vehicle using the sensor data of step 601 as an input to the one or more ADAS systems.

At step 604, the digital behavioral twin for the remote vehicle is updated so that the digital behavioral twin describes the remote driver's observed driving action (as determined in step 603) in the observed driving context (as determined at step 602). Accordingly, the twin data for the remote vehicle is updated to describe this update for the digital behavioral twin of this remote vehicle.

Referring to FIG. 7, depicted is a flowchart of an example method 700 for determining risk data according to some embodiments.

At step 701, a current driving context of one or more remote vehicles is determined.

At step 702, twin data describing the digital behavioral twins of the one or more remote vehicles is retrieved or obtained. In some embodiments, the twin data for the remote vehicles is obtained via V2X or V2V communication with these remote vehicles.

At step 703, an estimate is generated describing the most probable next set of actions for the one or more remote vehicles. This estimate is described by the estimate data. In some embodiments, this estimate is an example of a first estimate. In some embodiments, this estimate describes the most probable next set of actions for the one or more remote vehicles and the most probable geographic locations of each of the next set of actions of the one or more remote vehicles within the roadway environment.

At step 704, a current driving context of the ego vehicle is determined.

At step 705, an estimate is generated describing the most probable next set of actions for the ego vehicle. This estimate is described by the estimate data. In some embodiments, this estimate is an example of a second estimate. In some embodiments, this estimate describes the most probable next set of actions for the ego vehicle and the most probable geographic locations for each of the next set of actions for the ego vehicle within the roadway environment.

At step 706, risk data is generated describing: (1) a risk of a collision within the roadway environment involving one or more of the ego vehicle and the one or more remote vehicles; and (2) the location associated with this risk of collision. In some embodiments, the risk data describes, for each geographic location within the roadway environment, the risk of a collision at this geographic location. In this way, the risk data describes a set of geographic locations within the roadway environment and the risks of collision for each of these geographic locations. The risk data is then used to generate the AR data, examples of the output of which are depicted in FIGS. 8 and 9. Note that the risk gradients depicted in FIGS. 8 and 9 visually depict the risk of collision for each geographic location which is viewable when looking through the electronic display.

Referring to FIG. 8, depicted is a block display of an example 800 of an electronic display overlaying a windshield of an ego vehicle displaying a graphical output visually depicting a risk gradient describing a risk posed by a set of remote vehicles to an ego vehicle at a plurality of geographic locations within a roadway environment according to some embodiments. In some embodiments, the graphical output is described by the AR data. For example, the graphical output is an example of an AR visualization as described herein according to some embodiments.

Referring to FIG. 9, depicted is a block display of an example 900 of an electronic display overlaying a windshield of an ego vehicle displaying a graphical output visually depicting a risk gradient describing a risk posed by a set of remote vehicles to an ego vehicle at a plurality of geographic locations within a roadway environment according to some embodiments. In some embodiments, the graphical output is described by the AR data. For example, the graphical output is an example of an AR visualization as described herein according to some embodiments.

Referring to FIG. 10, depicted is a table 1000 depicting a comparison of the embodiments described herein versus the existing solutions described in the background according to some embodiments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   recording digital data describing a driving context and a driving behavior of a remote vehicle and an ego vehicle;
   determining a risk of a collision involving one or more of the remote vehicle and the ego vehicle based on a first digital behavioral twin of the remote vehicle, a second digital behavioral twin of the ego vehicle and the digital data, wherein the first digital behavioral twin models the driving behavior of a remote driver of the remote vehicle in one or more different driving contexts; and
   modifying an operation of the ego vehicle based on the risk.

2. The method of claim 1, wherein modifying the operation of the ego vehicle includes an electronic display of the ego vehicle displaying a graphical output that visually depicts the risk.

3. The method of claim 2, wherein the graphical output is an augmented reality (AR) visualization that depicts the risk of the collision for each portion of a roadway currently being traveled or about to be traveled.

4. The method of claim 1, further comprising the remote vehicle transmitting a vehicle-to-anything (V2X) message to the ego vehicle, wherein the V2X messages includes remote twin data describing the first digital behavioral twin.

5. The method of claim 1, wherein the one or more different driving contexts is based on a pattern of the remote driver accelerating or breaking in response to a change of a traffic light.

6. The method of claim 1, wherein the second digital behavioral twin models the driving behavior of an ego driver of the ego vehicle in a plurality of different driving contexts.

7. The method of claim 1, wherein the ego vehicle is an autonomous vehicle.

8. The method of claim 7, wherein modifying the operation of the ego vehicle includes the ego vehicle autonomously taking an action to modify the risk.

9. The method of claim 1, further comprising modifying the first digital behavioral twin based on new digital data describing a different driving behavior of the remote vehicle in the driving context, wherein the first digital behavioral twin is modified to include this different driving behavior.

10. A system comprising:
    a non-transitory memory storing digital data describing a driving context and a driving behavior of a remote vehicle and an ego vehicle; and
    a processor that is communicatively coupled to the non-transitory memory, wherein the non-transitory memory stores computer code which, when executed by the processor, causes the processor to:
      determine a risk of a collision involving one or more of the remote vehicle and the ego vehicle based on a first digital behavioral twin of the remote vehicle, a second digital behavioral twin of the ego vehicle and the digital data, wherein the first digital behavioral twin models the driving behavior of a remote driver of the remote vehicle in one or more different driving contexts; and
      modify an operation of the ego vehicle based on the risk.

11. The system of claim 10, wherein modifying the operation of the ego vehicle includes an electronic display of the ego vehicle displaying a graphical output that visually depicts the risk.

12. The system of claim 11, wherein the graphical output is an augmented reality (AR) visualization that uses corresponding colored regions to indicate the risk of the collision for each portion of a roadway currently being traveled or about to be traveled.

13. The system of claim 10, wherein the first digital behavioral twin is described by remote twin data that is received via a vehicle-to-anything (V2X) message received by the ego vehicle and transmitted by the remote vehicle.

14. The system of claim 10, wherein the one or more different driving contexts is based on a pattern of the remote driver accelerating or breaking in response to a change of a traffic light.

15. The system of claim 10, wherein the second digital behavioral twin models the driving behavior of an ego driver of the ego vehicle in a plurality of different driving contexts.

16. The system of claim 10, wherein the ego vehicle is an autonomous vehicle and modifying the operation of the ego vehicle includes the ego vehicle autonomously taking an action to modify the risk.

17. The system of claim 10, wherein the non-transitory memory stores additional computer code which, when executed by the processor, causes the processor to modify the first digital behavioral twin based on new digital data describing a different driving behavior of the remote vehicle in the driving context, wherein the first digital behavioral twin is modified to include this different driving behavior.

18. A computer program product comprising a non-transitory memory storing computer-executable code that, when executed by a processor, causes the processor to:
    record digital data describing a driving context and a driving behavior of a remote vehicle and an ego vehicle;
    determine a risk of a collision involving one or more of the remote vehicle and the ego vehicle based on a first digital behavioral twin of the remote vehicle, a second digital behavioral twin of the ego vehicle and the digital data, wherein the first digital behavioral twin models the driving behavior of a remote driver of the remote vehicle in one or more different driving contexts; and
    modify an operation of the ego vehicle based on the risk.

19. The computer program product of claim 18, wherein modifying the operation of the ego vehicle includes an electronic display of the ego vehicle displaying a graphical output that visually depicts the risk.

20. The computer program product of claim 18, wherein the computer-executable code, when executed by the processor, further causes the processor to modify the first digital behavioral twin based on new digital data describing a different driving behavior of the remote vehicle in the driving context, wherein the first digital behavioral twin is modified to include this different driving behavior.

* * * * *